United States Patent
Weissman et al.

(10) Patent No.: US 7,474,793 B2
(45) Date of Patent: Jan. 6, 2009

(54) METHODS FOR COMPRESSION USING A DENOISER

(75) Inventors: Itschak Weissman, Menlo Park, CA (US); Erik Ordentlich, San Jose, CA (US); Gadiel Seroussi, Cupertino, CA (US); Sergio Verdu, Princeton, NJ (US); Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 10/933,789

(22) Filed: Sep. 2, 2004

(65) Prior Publication Data
US 2006/0045360 A1 Mar. 2, 2006

(51) Int. Cl.
*G06K 9/36* (2006.01)
(52) U.S. Cl. ..................................... 382/235
(58) Field of Classification Search .............. 382/166, 382/232, 234–252, 254–255, 260, 266, 270, 382/274–275; 348/607–608, 403.1–404.1, 348/425.2; 375/240.18, 240.2, 240.23, 240.27, 375/E7.145, E7.189, E7.193, E7.281
See application file for complete search history.

(56) References Cited

U.S. PATENT DOCUMENTS

| | | | | |
|---|---|---|---|---|
| 5,719,958 A | * | 2/1998 | Wober et al. | 382/199 |
| 7,095,907 B1 | * | 8/2006 | Berkner et al. | 382/298 |
| 7,120,297 B2 | * | 10/2006 | Simard et al. | 382/166 |
| 7,120,305 B2 | * | 10/2006 | Berkner | 382/240 |
| 7,206,459 B2 | * | 4/2007 | Berkner et al. | 382/251 |
| 7,271,749 B2 | * | 9/2007 | Weissman et al. | 341/107 |

\* cited by examiner

*Primary Examiner*—Jose L Couso

(57) ABSTRACT

Various embodiments of the present invention provide a compression method and system that compresses received data by first denoising the data and then losslessly compressing the denoised data. Denoising removes high entropy features of the data to produce lower entropy, denoised data that can be efficiently compressed by a lossless compression technique. One embodiment of the invention is a universal lossy compression method obtained by cascading a denoising technique with a universal lossless compression method. Alternative embodiments include methods obtained by cascading a denoising technique with one or more lossy or lossless compression methods.

18 Claims, 19 Drawing Sheets

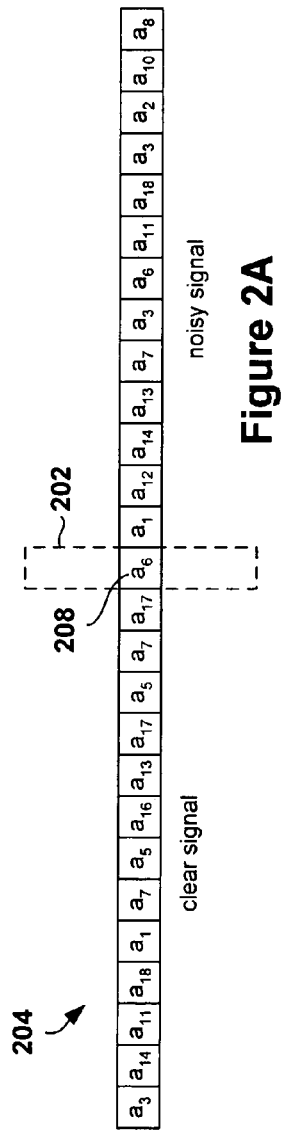
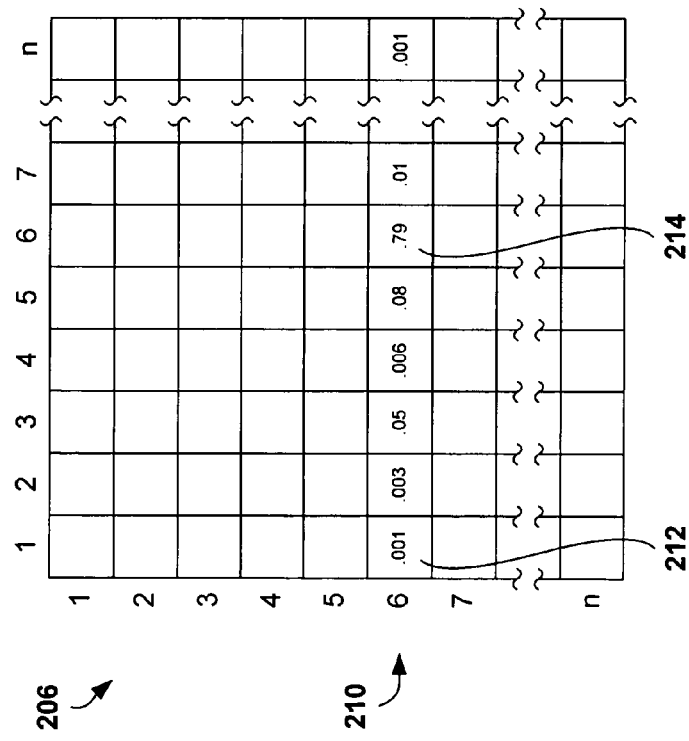
Figure 2A
Figure 2B $$\begin{array}{c c c c c}
\pi_1 & \pi_2 & \pi_3 & \cdots & \pi_n
\end{array}$$

$$\Pi = \begin{bmatrix} Pa_1 \rightarrow a_1 & Pa_1 \rightarrow a_2 & Pa_1 \rightarrow a_3 & \cdots & Pa_1 \rightarrow a_n \\ Pa_2 \rightarrow a_1 & Pa_2 \rightarrow a_2 & Pa_2 \rightarrow a_3 & \cdots & Pa_2 \rightarrow a_n \\ Pa_3 \rightarrow a_1 & Pa_3 \rightarrow a_2 & Pa_3 \rightarrow a_3 & \cdots & Pa_3 \rightarrow a_n \\ \vdots & \vdots & \vdots & & \vdots \\ Pa_n \rightarrow a_1 & Pa_n \rightarrow a_2 & Pa_n \rightarrow a_3 & \cdots & Pa_n \rightarrow a_n \end{bmatrix} \quad 216$$

Figure 2C

| 0 | 0 | 255 | 255 | 125 | 0 | 0 |
|---|---|---|---|---|---|---|
| 0 | 0 | 255 | 0 | 255 | 0 | 0 |
| 0 | 0 | 255 | 0 | 255 | 0 | 0 |
| 0 | 0 | 255 | 255 | 125 | 0 | 0 |
| 0 | 0 | 255 | 0 | 0 | 0 | 0 |
| 0 | 0 | 255 | 0 | 0 | 0 | 0 |
| 0 | 0 | 255 | 0 | 0 | 0 | 0 |
Figure 5A
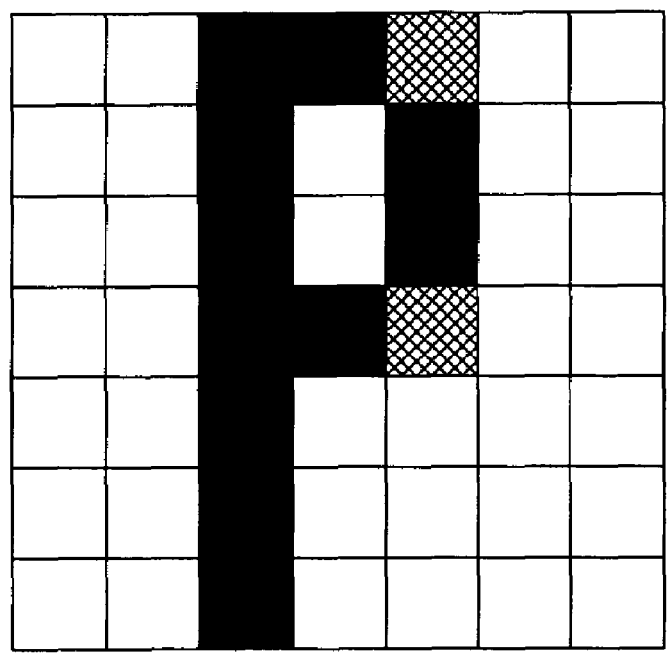
Figure 5B

| 0 | 0 | 255 | 255 | 10 | 0 | 0 |
|---|---|---|---|---|---|---|
| 0 | 0 | 255 | 0 | 10 | 0 | 0 |
| 18 | 0 | 255 | 0 | 255 | 0 | 0 |
| 0 | 0 | 255 | 255 | 125 | 0 | 0 |
| 0 | 0 | 255 | 0 | 0 | 0 | 6 |
| 0 | 0 | 251 | 0 | 0 | 0 | 0 |
| 0 | 223 | 255 | 0 | 0 | 0 | 0 |

$$\begin{bmatrix} da_1 \to a_1 & da_1 \to a_2 & da_1 \to a_3 & \cdots & da_1 \to a_n \\ da_2 \to a_1 & da_2 \to a_2 & da_2 \to a_3 & \cdots & da_2 \to a_n \\ da_3 \to a_1 & da_3 \to a_2 & da_3 \to a_3 & \cdots & da_3 \to a_n \\ \vdots & \vdots & \vdots & & \vdots \\ da_n \to a_1 & da_n \to a_2 & da_n \to a_3 & \cdots & da_n \to a_n \end{bmatrix}$$

with columns labeled $\lambda_1, \lambda_2, \lambda_3, \cdots, \lambda_n$ $\Lambda$

Figure 6

$$\begin{bmatrix} da_1 \to a_x \\ da_2 \to a_x \\ \vdots \\ da_n \to a_x \end{bmatrix} \odot \begin{bmatrix} Pa_1 \to a_\alpha \\ Pa_2 \to a_\alpha \\ Pa_3 \to a_\alpha \\ \vdots \\ Pa_n \to a_\alpha \end{bmatrix} = \begin{bmatrix} da_1 \to a_x \; Pa_1 \to a_\alpha \\ da_2 \to a_x \; Pa_2 \to a_\alpha \\ da_3 \to a_x \; Pa_3 \to a_\alpha \\ \vdots \\ da_n \to a_x \; Pa_n \to a_\alpha \end{bmatrix}$$

$\lambda_{a_x} \qquad \pi_{a_\alpha} \qquad \lambda_{a_x} \odot \pi_{a_\alpha}$

Figure 7

$$q^T(s_{noisy}, s_{clear}, b, c) \times \begin{bmatrix} \lambda_{a_x} \odot \pi_{a_\alpha} \end{bmatrix} = \text{distortion expected for replacing } a_\alpha \text{ in } ba_\alpha c \text{ in } s_{noisy} \text{ by } a_x$$

Figure 8

$$\underbrace{m^T(s_{noisy}, b, c)}_{\boxed{361 \mid 7 \mid 321 \mid 14 \mid 81 \mid 25}} \times \begin{bmatrix} \Pi^{-1} \end{bmatrix} \cong \underbrace{q^T(s_{noisy}, s_{clear}, b, c)}_{\boxed{325 \mid 18 \mid 340 \mid 16 \mid 41 \mid 30}}$$

Figure 9

| string | code |
|---|---|
| 0 | 0001 |
| 01 | 0010 |
| 00 | 0011 |
| 011 | 0100 |
| 010 | 0101 |
| 0100 | 0110 |
| 000 | 0111 |
| 1 | 1000 |
| 0101 | 1001 |
| 10 | 1010 |
| 0001 | 1011 |
| 01000 | 1100 |
| 11 | 1101 |
| ⋮ | ⋮ |

US 7,474,793 B2

METHODS FOR COMPRESSION USING A DENOISER

TECHNICAL FIELD

The present invention is related to data compression methods and systems and, in particular, to a compression method that employs both a denoiser and a compression method.

BACKGROUND OF THE INVENTION

Compression techniques are widely used in computing, data storage, and electronic communications for decreasing the volume of data to allow more efficient storage and/or transmission. For example, current modem-based and DSL interconnections do not provide sufficient data transmission bandwidth to allow for transmission of uncompressed, real-time video signals at resolutions close to the resolution of broadcast television. However, highly compressed video signals can be transmitted through such internet connections and decompressed and displayed on a user's computer.

Data compression can be carried out in either a lossy or a lossless fashion. Lossy compression can generally provide much better compression ratios, but the decompressed data is generally distorted with respect to the original data. For example, in lossy compression of video signals, the decompressed video signal may have lower resolution and lower displayed frame rates. By contrast, lossless compression compresses data so that the compressed data can be accurately decompressed to identically restore the original data.

Many lossless and lossy compression methods assume a statistical model of the data being compressed. Discrepancies between the model assumed by a method and the actual statistical properties of the data result in poor compression and/or increased distortion in the reconstructed signal. Universal compression methods mitigate this problem by adapting method parameters to better suit the actual data being compressed. The various embodiments of the Lempel-Ziv compression method comprise one set of successful and widely deployed universal lossless compression methods. The Lempel-Ziv method and other lossless universal compression methods also possess certain optimality properties in a variety of formal mathematical settings involving data generated by stochastic processes and/or classes of competing data-tuned compression methods. In contrast to the lossless case, all universal lossy compression methods known to be optimal in the formal mathematical settings are hopelessly complex computationally and hence impractical. Practical universal lossy compression methods are therefore heuristically driven. Designers, developers, and users of compression methods and systems are constantly seeking new compression techniques that provide better computational efficiency and other advantages, such as improved heuristics for universal lossy compression methods.

SUMMARY OF THE INVENTION

Various embodiments of the present invention provide a lossy compression method and system that compresses received data by first denoising the data and then compressing the denoised data. Denoising removes high entropy features of the data to produce lower entropy, denoised data that can be efficiently compressed by a lossless compression technique. One embodiment of the invention is a universal lossy compression method obtained by cascading a denoising technique with a universal lossless compression method. Alternative embodiments include methods obtained by cascading a denoising technique with one or more lossy or lossless compression methods.

BRIEF DESCRIPTION OF THE DRAWINGS

FIGS. 2A-D illustrate a motivation for a discrete denoiser related to characteristics of the noise-introducing channel.

FIGS. 5A-D illustrate the concept of symbol-corruption-related distortion in a noisy or recovered signal.

FIG. 6 displays one form of the symbol-transformation distortion matrix $\Lambda$.

FIG. 7 illustrates computation of the relative distortion expected from replacing a symbol "$a_a$" in a received, noisy signal by the symbol "$a_x$."

FIG. 8 illustrates use of the column vector $\lambda_{a_x} \Box \pi_{a_a}$ to compute a distortion expected for replacing the center symbol $a_a$ in the metasymbol $ba_ac$ in a noisy signal "$s_{noisy}$" by the replacement symbol $a_x$.

FIG. 9 shows estimation of the counts of the occurrences of symbols "$a_1$"-"$a_n$" for the clean signal.

DETAILED DESCRIPTION OF THE INVENTION

Embodiments of the present invention relate to compression techniques. To facilitate discussion of these embodiments of the present invention, a discrete denoiser implementation is discussed, in a first subsection below, followed by discussion of lossless and lossy compression techniques, in a second subsection. Finally, in a third subsection, methods for compression using a denoiser are discussed.

Dude

Figure 1:
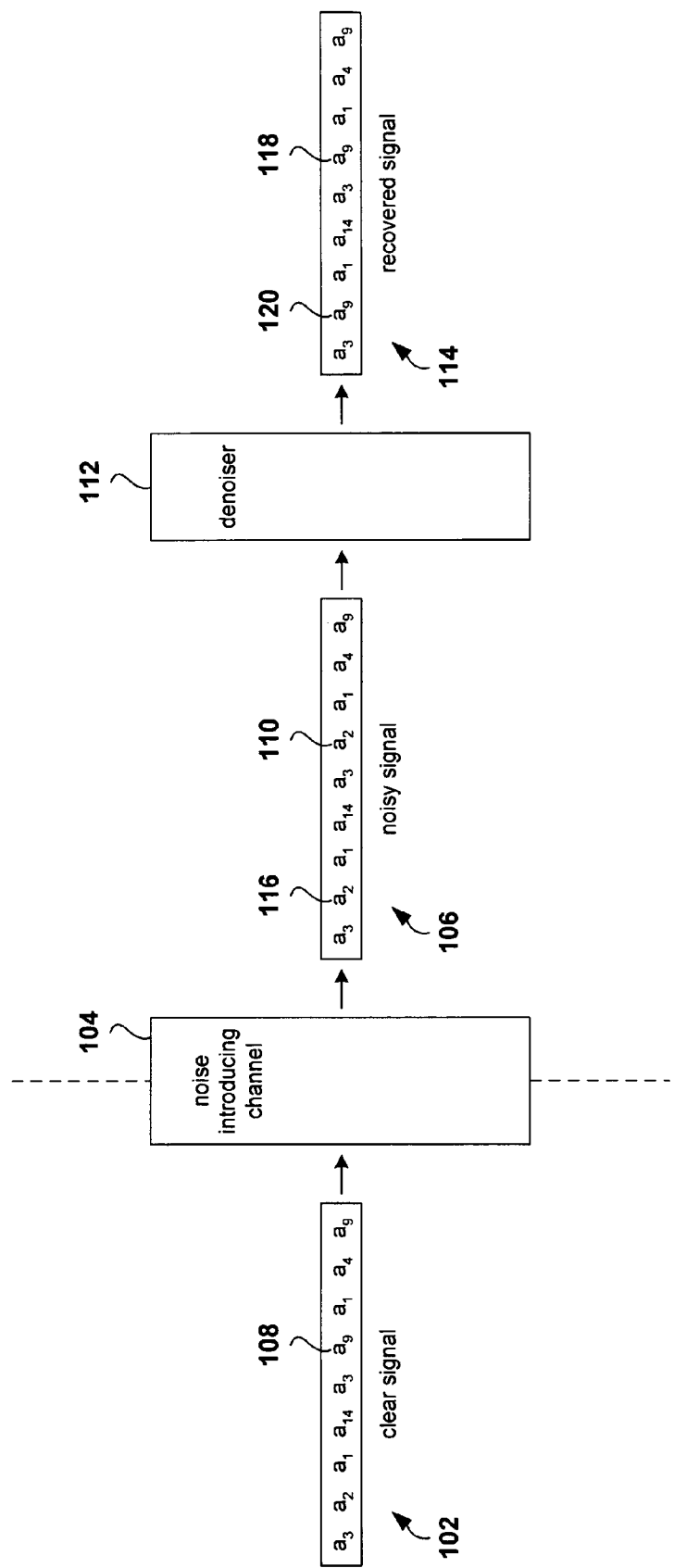
FIG. 1 illustrates introduction of noise into a clean signal to produce a noisy signal and subsequent denoising of the noisy signal to produce a recovered signal.

FIG. 1 illustrates introduction of noise into a clean signal to produce a noisy signal and subsequent denoising of the noisy signal to produce a recovered signal. In FIG. 1, signals are represented as sequences of symbols that are each members of an alphabet A having n distinct symbols, where A is:

$$A = (a_1, a_2, a_3, \ldots a_n)$$

Note that the subscripts refer to the positions of the respective symbols within an ordered listing of the different symbols of the alphabet, and not to the positions of symbols in a signal. In FIG. 1, an initial, clean signal 102 comprises an ordered sequence of nine symbols from the alphabet A. In normal circumstances, an input signal would generally have thousands, millions, or more symbols. The short input signal 102 is used for illustrative convenience.

The clean signal 102 is transmitted or passed through a noise-introducing channel 104, producing a noisy signal 106. In the example shown in FIG. 1, the output signal 106 comprises symbols from the same alphabet as the input signal 102, although, in general, the input symbols may be chosen from a different, equally sized or smaller alphabet than that from which the output symbols are selected. In the example shown in FIG. 1, the sixth symbol in the clean signal 108, "$a_9$," is altered by the noise-introducing channel to produce the symbol "$a_2$" 110 in the noisy signal 106. There are many different types of noise-introducing channels, each type characterized by the types and magnitudes of noise that the noise-introducing channel introduces into a clean signal. Examples of noise-introducing channels include electronic communications media, data storage devices to which information is transferred and from which information is extracted, and transmission and reception of radio and television signals. In this discussion, a signal is treated as a linear, ordered sequence of symbols, such as a stream of alphanumeric characters that comprise a text file, but the actual data into which noise is introduced by noise-introducing channels in real world situations may include two-dimensional images, audio signals, video signals, and other types of displayed and broadcast information.

In order to display, broadcast, or store a received, noisy signal with reasonable fidelity with respect to the initially transmitted clean signal, a denoising process may be undertaken to remove noise introduced into the clean signal by a noise-introducing channel. In FIG. 1, the noisy signal 106 is passed through, or processed by, a denoiser 112 to produce a recovered signal 114 which, when the denoising process is effective, is substantially closer to, or more perceptually similar to, the originally transmitted clean signal than to the received noisy signal.

Many types of denoisers have been proposed, studied, and implemented. Some involve application of continuous mathematics, some involve detailed knowledge of the statistical properties of the originally transmitted clean signal, and some rely on detailed information concerning time and sequence-dependent behavior of the noise-introducing channel. The following discussion describes a discrete denoiser, referred to as "DUDE," related to the present invention. The DUDE is discrete in the sense that the DUDE processes signals comprising discrete symbols using a discrete algorithm, rather than continuous mathematics. The DUDE is universal in that it asymptotically approaches the performance of an optimum denoiser employing knowledge of the clean-signal symbol-occurrence distributions.

The DUDE implementation is motivated by a particular noise-introducing-channel model and a number of assumptions. These are discussed below. However, DUDE may effectively function when the model and assumptions do not, in fact, correspond to the particular characteristics and nature of a noise-introducing channel. Thus, the model and assumptions motivate the DUDE approach, but the DUDE has a much greater range of effectiveness and applicability than merely to denoising signals corrupted by a noise-introducing channel corresponding to the motivating model and assumptions.

As shown in FIG. 1, the DUDE 112 employs a particular strategy for denoising a noisy signal. The DUDE considers each symbol within a context generally comprising one or more symbols preceding and following the symbol according to a left to right ordering. For example, in FIG. 1, the two occurrences of the symbol "$a_2$" in the noisy signal 106 occur within the same single preceding-and-following-symbol context. The full context for the two occurrences of the symbol "$a_2$" in the noisy signal 106 of the example in FIG. 1 is ["$a_3$," "$a_1$"]. The DUDE either leaves all symbols of a particular type "$a_i$" within a particular context unchanged, or changes all occurrences of a particular type of symbol "$a_i$" within a particular context to a different symbol "$a_j$." For example, in FIG. 1, the denoiser has replaced all occurrences of the symbol "$a_2$" 110 and 112 in the noisy signal within the full context ["$a_3$," "$a_1$"] with the symbol "$a_9$" 114 and 116 in the recovered symbol. Thus, the DUDE does not necessarily produce a recovered signal identical to the originally transmitted clean signal, but instead produces a denoised, recovered signal with less distortion with respect to the clean signal than the distortion within the noisy signal. In the above example, replacement of the second symbol "$a_2$" 110 with the symbol "$a_9$" 114 restores the originally transmitted symbol at that position, but replacement of the first occurrence of symbol "$a_2$" 112 in the noisy signal with the symbol "$a_9$" 116 introduces a new distortion. The DUDE only replaces one symbol with another to produce the recovered signal when the DUDE estimates that the overall distortion of the recovered signal with respect to the clean signal will be less than the distortion of the noisy signal with respect to the clean signal.

Figure 2D:
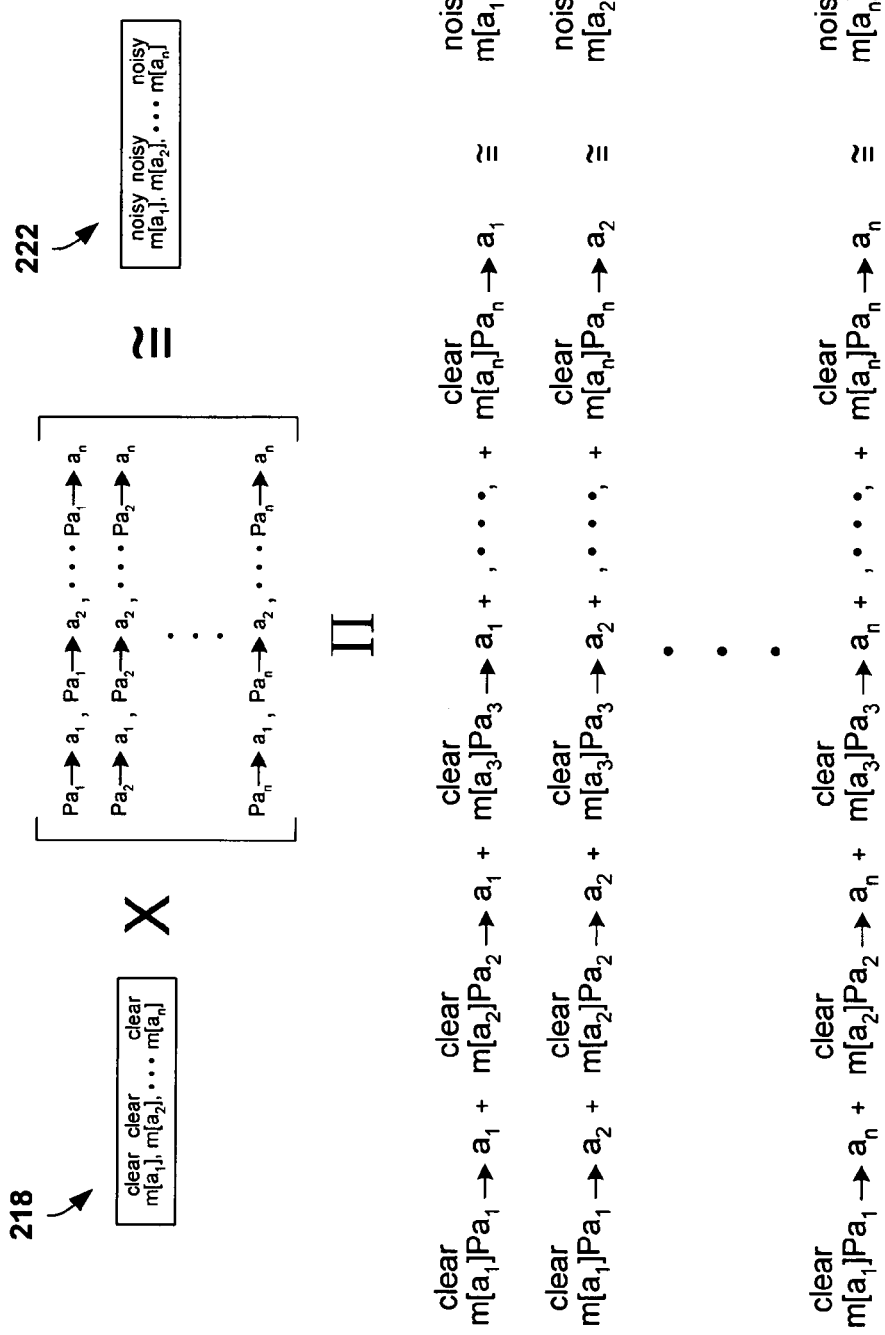

FIGS. 2A-D illustrate a motivation for DUDE related to characteristics of the noise-introducing channel. DUDE assumes a memory-less channel. In other words, as shown in FIG. 2A, the noise-introducing channel 202 may be considered to act as a one-symbol window, or aperture, through which a clean signal 204 passes. The noise-introducing channel 202 corrupts a given clean-signal symbol, replacing the given symbol with another symbol in the nosy signal, with an estimateable probability that depends neither on the history of symbols preceding the symbol through the noise-introducing channel nor on the symbols that are subsequently transmitted through the noise-introducing channel.

FIG. 2B shows a portion of a table 206 that stores the probabilities that any particular symbol from the alphabet A, "$a_i$," may be corrupted to a symbol "$a_j$" during transmission through the noise-introducing channel. For example, in FIG. 2A, the symbol "$a_6$" 208 is currently passing through the noise-introducing channel. Row 210 in table 206 contains the probabilities that symbol "$a_6$" will be corrupted to each of the different, possible symbols in the alphabet A. For example, the probability that the symbol "$a_6$" will be changed to the symbol "$a_1$" 212 appears in the first cell of row 210 in table 206, indexed by the integers "6" and "1" corresponding to the positions of symbols "$a_6$" and "$a_1$" in the alphabet A. The probability that symbol "$a_6$" will be faithfully transferred, without corruption, through the noise-introducing channel 214 appears in the table cell with indices (6, 6), the probability of symbol "$a_6$" being transmitted as the symbol "$a_6$." Note that the sum of the probabilities in each row of the table 206 is 1.0, since a given symbol will be transmitted by the noise-introducing channel either faithfully or it will be corrupted to some other symbol in alphabet A. As shown in FIG. 2C, table 206 in FIG. 2B can be alternatively expressed as a two-dimensional matrix Π 216, with the matrix element identified by indices (i, j) indicating the probability that symbol "$a_i$" will be transmitted by the noise-introducing channel as symbol "$a_j$." Note also that a column j in matrix Π may be referred to as "$\pi_j$" or $\pi_{a_j}$.

As shown in FIG. 2D, a row vector 218 containing the counts of the number of each type of symbol in the clean signal, where, for example, the number of occurrences of the symbol "$a_5$" in the clean signal appears in the row vector as $m^{clean}[a_5]$, can be multiplied by the symbol-transition-probability matrix $\Pi$ 220 to produce a row vector 222 containing the expected counts for each of the symbols in the noisy signal. The actual occurrence counts of symbols "$a_i$" in the noisy signal appear in the row vector $m^{noisy}$. The matrix multiplication is shown in expanded form 224 below the matrix multiplication in FIG. 2D. Thus, in vector notation:

$$m^{clean}\Pi \cong m^{noisy}$$

where
- $m^{clean}$ is a row vector containing the occurrence counts of each symbol $a_i$ in alphabet A in the clean signal; and
- $m^{noisy}$ is a row vector containing the occurrence counts of each symbol $a_i$ in alphabet A in the noisy signal.

The approximation symbol $\cong$ is employed in the above equation, because the probabilities in the matrix $\Pi$ give only the expected frequency of a particular symbol substitution, while the actual symbol substitution effected by the noise-introducing channel is random. In other words, the noise-introducing channel behaves randomly, rather than deterministically, and thus may produce different results each time a particular clean signal is transmitted through the noise-introducing channel. The error in the approximation, obtained as the sum of the absolute values of the components of the difference between the left and right sides of the approximation, above, is generally small relative to the sequence length, on the order of the square root of the sequence length. Multiplying, from the right, both sides of the above equation by the inverse of matrix $\Pi$, assuming that $\Pi$ is invertible, allows for calculation of an estimated row-vector count of the symbols in the clean signal, $\hat{m}^{clean}$, from the counts of the symbols in the noisy signal, as follows:

$$\hat{m}^{clean} = m^{noisy}\Pi^{-1}$$

In the case where the noisy symbol alphabet is larger than the clean symbol alphabet, it is assumed that $\Pi$ is full-row-rank and the inverse in the above expression can be replaced by a generalized inverse, such as the Moore-Penrose generalized inverse.

As will be described below, the DUDE applies clean symbol count estimation on a per-context basis to obtain estimated counts of clean symbols occurring in particular noisy symbol contexts. The actual denoising of a noisy symbol is then determined from the noisy symbol's value, the resulting estimated context-dependent clean symbol counts, and a loss or distortion measure, in a manner described below.

As discussed above, the DUDE considers each symbol in a noisy signal within a context. The context may be, in a linear signal, such as that used for the example of FIG. 1, the values of a number of symbols preceding, following, or both preceding and following a currently considered signal. In 2-dimensional or higher dimensional signals, the context may be values of symbols in any of an almost limitless number of different types of neighborhoods surrounding a particular symbol. For example, in a 2-dimensional image, the context may be the eight pixel values surrounding a particular, interior pixel. In the following discussion, a linear, 1-dimensional signal is used for examples, but higher dimensional signals can be effectively denoised by the DUDE.

Figure 3A:
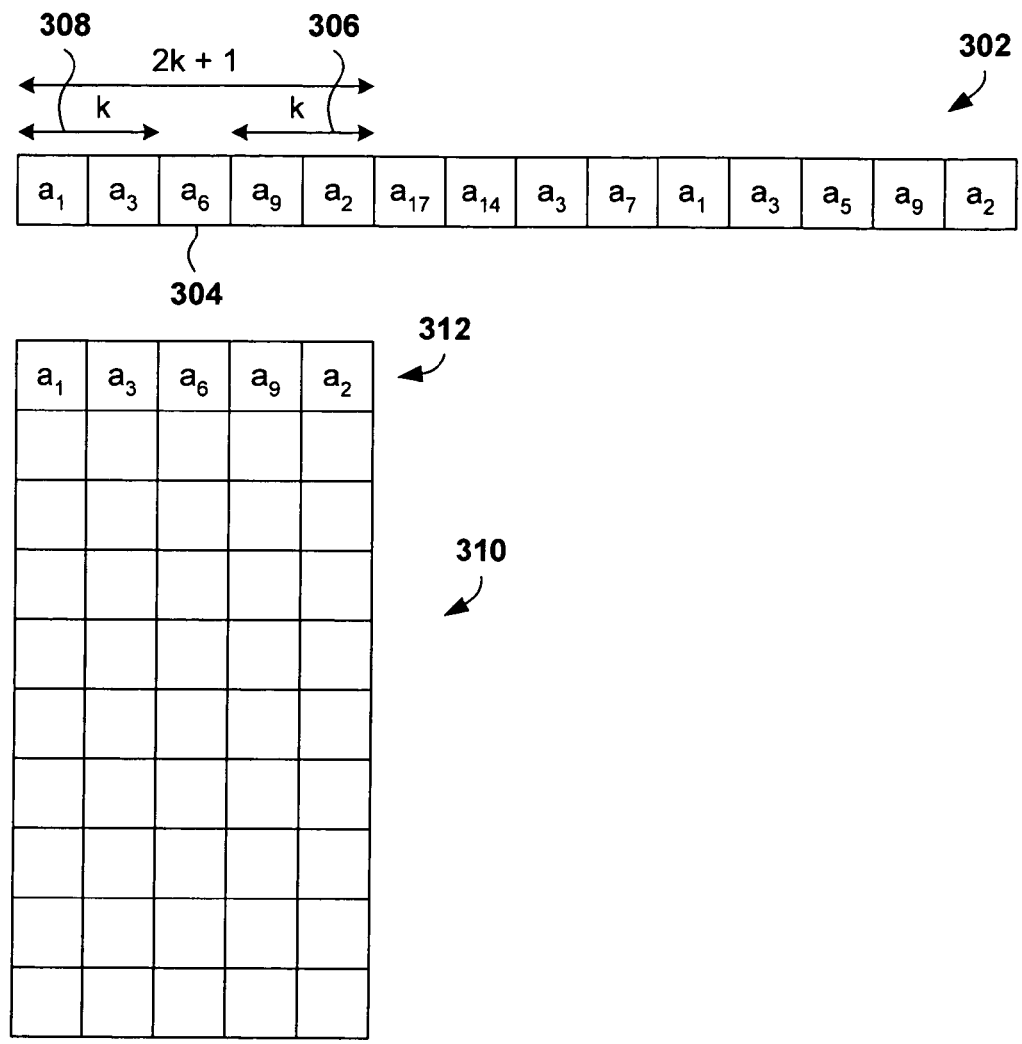
FIGS. 3A-D illustrate a context-based, sliding window approach by which a discrete denoiser characterizes the occurrences of symbols in a noisy signal.

In order to consider occurrences of symbols within contexts in the 1-dimensional-signal case, the DUDE needs to consider a number of symbols adjacent to each, considered symbol. FIGS. 3A-D illustrate a context-based, sliding window approach by which the DUDE characterizes the occurrences of symbols in a noisy signal. FIGS. 3A-D all employ the same illustration conventions, which are described only for FIG. 3A, in the interest of brevity. In FIG. 3A, a noisy signal 302 is analyzed by DUDE in order to determine the occurrence counts of particular symbols within particular contexts within the noisy signal. The DUDE employs a constant k to describe the length of a sequence of symbols preceding, and the length of a sequence of symbols subsequent to, a particular symbol that, together with the particular symbol, may be viewed as a metasymbol of length 2k+1. In the example of FIGS. 3A-D, k has the value "2." Thus, a symbol preceded by a pair of symbols and succeeded by a pair of symbols can be viewed as a five-symbol metasymbol. In FIG. 3A, the symbol "$a_6$" 304 occurs within a context of the succeeding k-length symbol string "$a_9a_2$" 306 and is preceded by the two-symbol string "$a_1a_3$" 308. The symbol "$a_6$" therefore occurs at least once in the noisy signal within the context ["$a_1a_3$," "$a_9a_2$"], or, in other words, the metasymbol "$a_1a_3a_6a_9a_2$" occurs at least once in the noisy signal. The occurrence of this metasymbol within the noisy signal 302 is listed within a table 310 as the first five-symbol metacharacter 312.

Figure 3B:
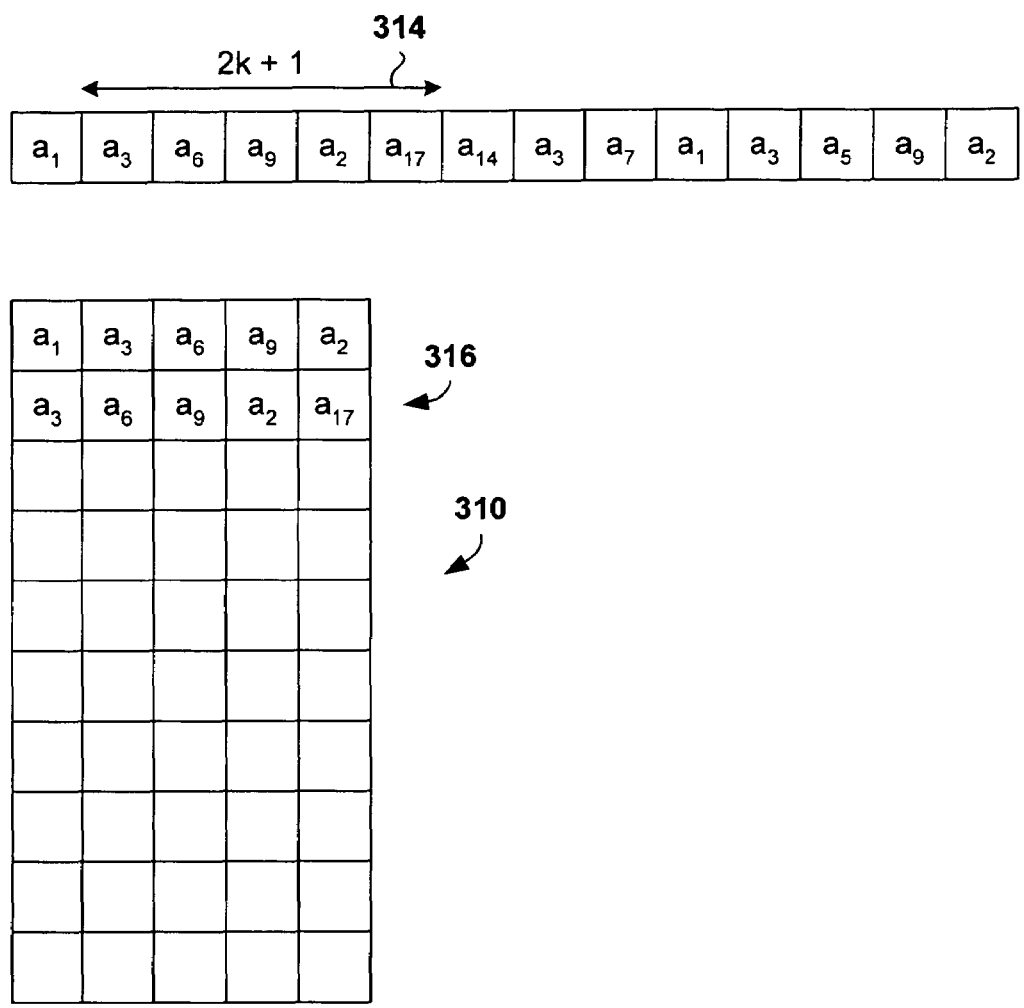
Figure 3C:
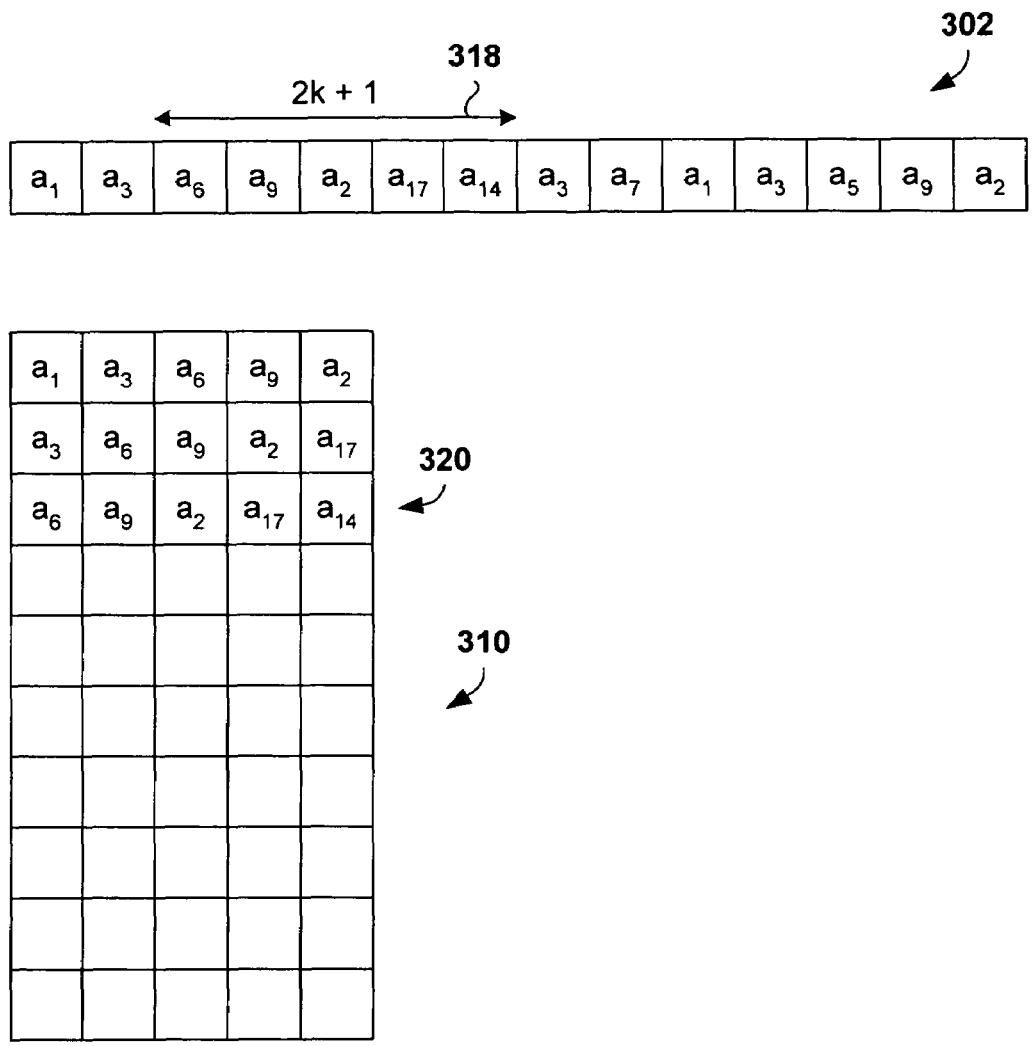
Figure 3D:
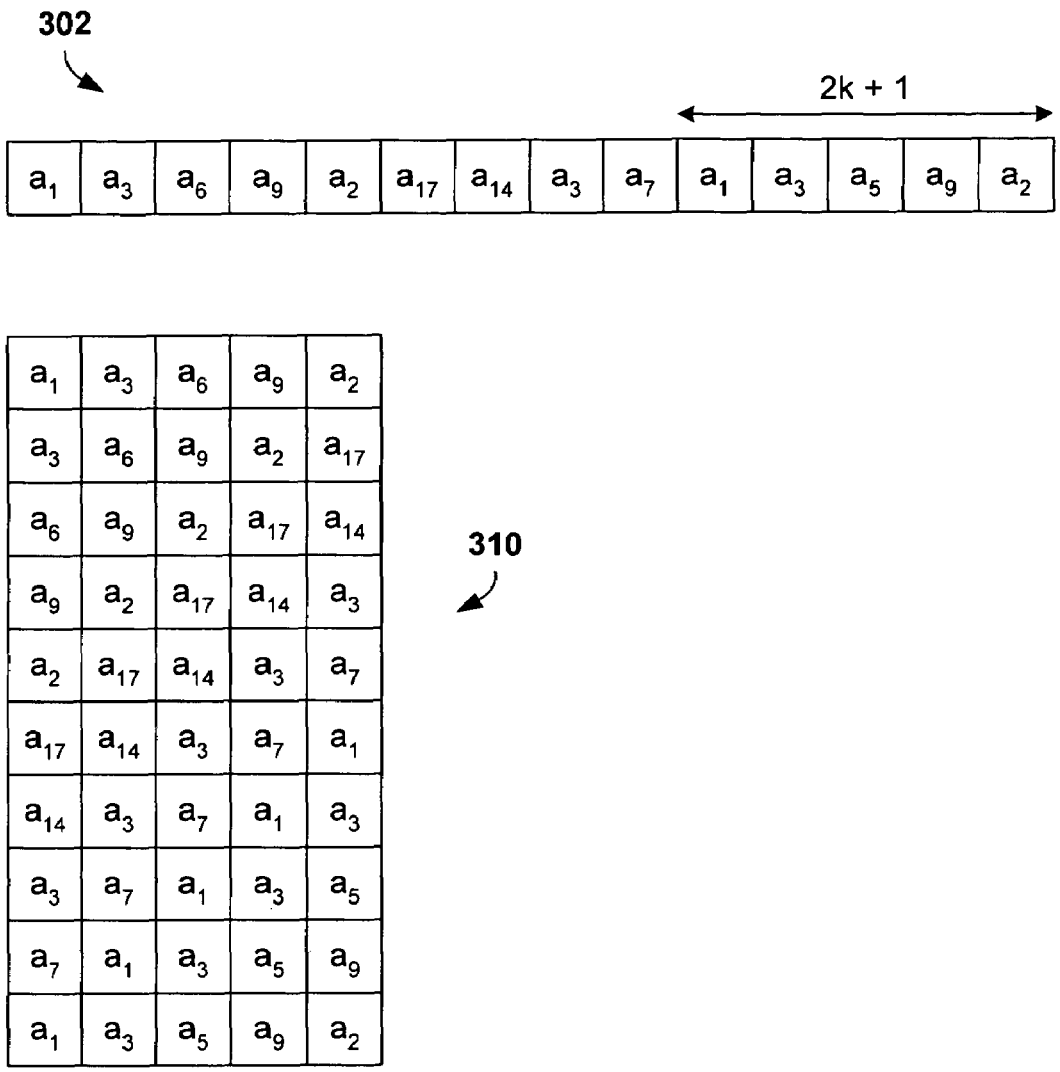

As shown in FIG. 3B, DUDE then slides the window of length 2k+1 rightward, by one symbol, to consider a second metasymbol 314 of length 2k+1. In this second metasymbol, the symbol "$a_9$" appears within the context ["$a_3a_6$," "$a_2a_{17}$"]. This second metasymbol is entered into table 310 as the second entry 316. FIG. 3C shows detection of a third metasymbol 318 in the noisy signal 302 and entry of the third metasymbol into table 310 as entry 320. FIG. 3D shows the table 310 following complete analysis of the short noisy signal 302 by DUDE. Although, in the examples shown in FIG. 3-D, DUDE lists each metasymbol as a separate entry in the table, in a more efficient implementation, DUDE enters each detected metasymbol only once in an index table, and increments an occurrence count each time the metasymbol is subsequently detected. In this fashion, in a first pass, DUDE tabulates the frequency of occurrence of metasymbols within the noisy signal or, viewed differently, DUDE tabulates the occurrence frequency of symbols within contexts comprising k preceding and k subsequent symbols surrounding each symbol.

Figure 4:
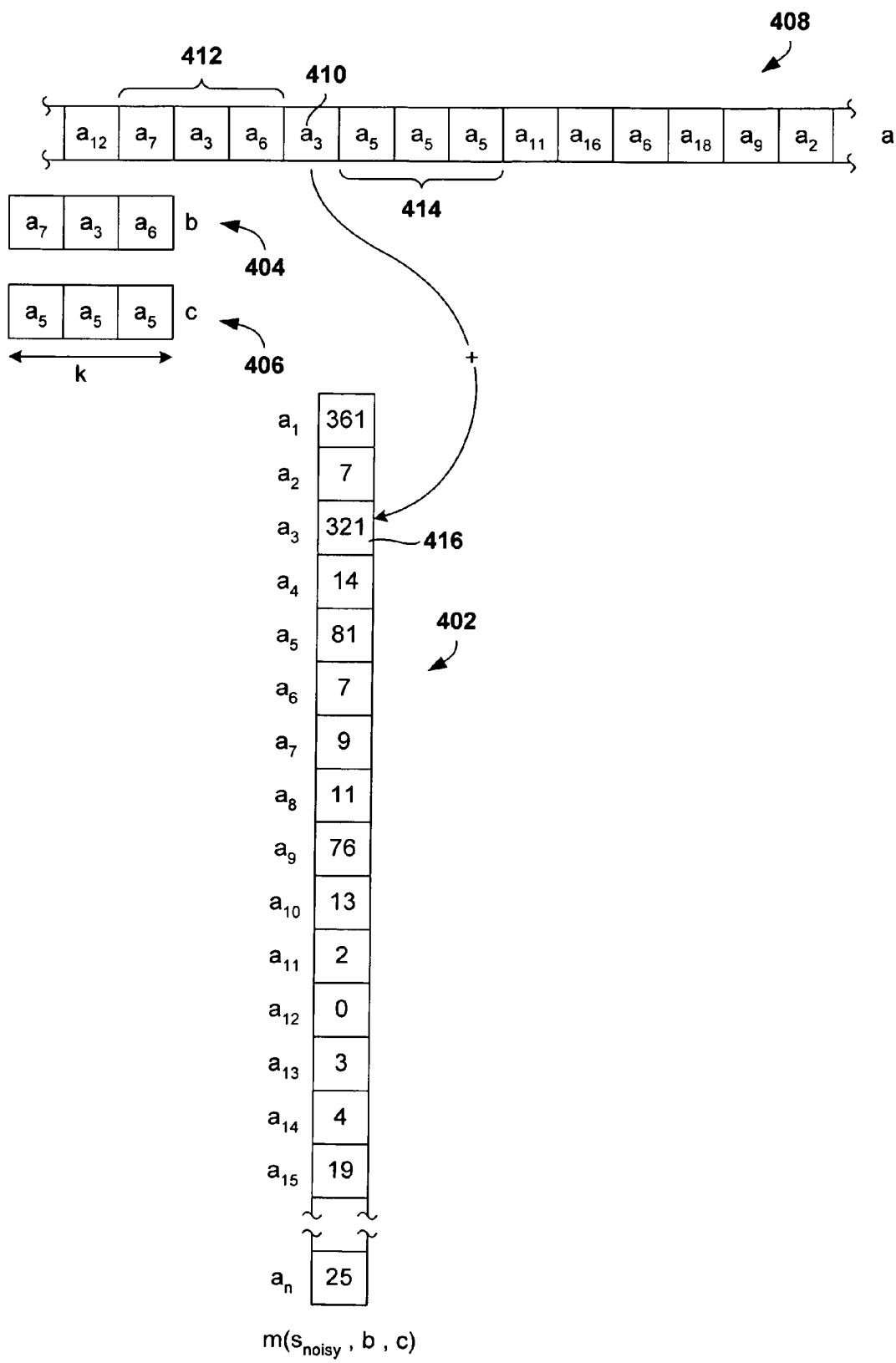
FIG. 4 illustrates a convenient mathematical notation and data structure representing a portion of the metasymbol table constructed by a discrete denoiser, as described with reference to FIGS. 3A-D.

FIG. 4 illustrates a convenient mathematical notation and data structure representing a portion of the metasymbol table constructed by DUDE, as described with reference to FIGS. 3A-D. The column vector $m(s_{noisy}, b, c)$ 402 represents a count of the occurrences of each symbol in the alphabet A within a particular context, represented by the k-length symbol vectors b and c, within the noisy signal $s_{noisy}$, where the noisy signal is viewed as a vector. In FIG. 4, for example, the context value for which the occurrence counts are tabulated in column vector $m(s_{noisy}, b, c)$ comprises the symbol vector 404 and the symbol vector 406, where k has the value 3. In the noisy signal $s_{noisy}$ 408, the symbol "$a_3$" 410 occurs within the context comprising three symbols 412 to the left of the symbol "$a_3$" 410 and three symbols 414 to the right of the symbol "$a_3$". This particular context has a value equal to the combined values of symbol vectors 404 and 406, denoted ["$a_7a_3a_6$," "$a_5a_5a_5$"] and this occurrence of the symbol "$a_3$" 410 within the context ["$a_7a_3a_6$," "$a_5a_5a_5$"], along with all other occurrences of the symbol "$a_3$" in the context ["$a_7a_3a_6$," "$a_5a_5a_5$"], is noted by a count 416 within the column vector $m(s_{noisy}, b, c)$, with [b,c]=["$a_7a_3a_6$," "$a_5a_5a_5$"]. In other words, a symbol "$a_3$" occurs within the context ["$a_7a_3a_6$," "$a_5a_5a_5$"] in the noisy signal $s_{noisy}$ 321 times. The counts for the occurrences of all other symbols "$a_1$", "$a_2$", and "$a_4$"-"$a_n$" in the context ["a₇a₃a₆," "a₅a₅a₅"] within noisy signal $s_{noisy}$ are recorded in successive elements of the column vector m($s_{noisy}$, "a₇a₃a₆", "a₅a₅a₅"). An individual count within a column vector m($s_{noisy}$,b,c) can be referred to using an array-like notation. For example, the count of the number of times that the symbol "a₃" appears in the context ["a₇a₃a₆," "a₅a₅a₅"] within the noisy signal $s_{noisy}$, 321, can be referred to as m($s_{noisy}$, "a₇a₃a₆", "a₅a₅a₅")[a₃].

DUDE employs either a full or a partial set of column vectors for all detected contexts of a fixed length 2k in the noisy signal in order to denoise the noisy signal. Note that an initial set of symbols at the beginning and end of the noisy signal of length k are not counted in any column vector m($s_{noisy}$,b,c) because they lack either sufficient preceding or subsequent symbols to form a metasymbol of length 2k+1. However, as the length of the noisy signal for practical problems tends to be quite large, and the context length k tends to be relatively small, DUDE's failure to consider the first and final k symbols with respect to their occurrence within contexts makes almost no practical different in the outcome of the denoising operation.

Figures 5C, 5D:
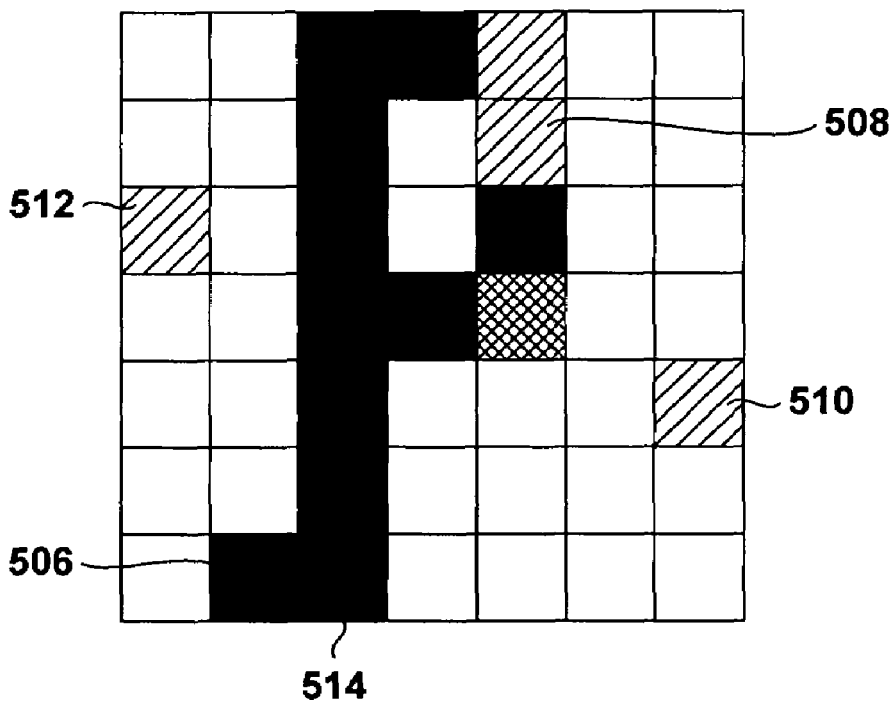

FIGS. 5A-D illustrate the concept of symbol-corruption-related distortion in a noisy or recovered signal. The example of FIGS. 5A-D relates to a 256-value gray scale image of a letter. In FIG. 5A, the gray-scale values for cells, or pixels, within a two-dimensional image 502 are shown, with the character portions of the symbol generally having a maximum gray-scale value of 255 and the background pixels having a minimum gray-scale value of zero. Visual display of the image represented by the two-dimensional gray-scale signal in FIG. 5A is shown in FIG. 5B 504. The gray-scale data in FIG. 5A is meant to represent a low resolution image of the letter "P." As shown in FIG. 5B, the image of the letter "P" is reasonably distinct, with reasonably high contrast.

FIG. 5C shows the gray-scale data with noise introduced by transmission through a hypothetical noise-introducing channel. Comparison of FIG. 5C to FIG. 5A shows that there is marked difference between the gray-scale values certain cells, such as cell 506, prior to, and after, transmission. FIG. 5D shows a display of the gray-scale data shown in FIG. 5C. The displayed image is no longer recognizable as the letter "P." In particular, two cells contribute greatly to the distortion of the figure: (1) cell 506, changed in transmission from the gray-scale value "0" to the gray-scale value "223"; and (2) cell 508, changed in transmission from the gray-scale value "255" to the gray-scale value "10." Other noise, such as the relatively small magnitude gray-scale changes of cells 510 and 512, introduce relatively little distortion, and, by themselves, would have not seriously impacted recognition of the letter "P." In this case, the distortion of the displayed image contributed by noise introduced into the gray-scale data appears to be proportional to the magnitude of change in the gray-scale value. Thus, the distorting effects of noise within symbols of a signal are not necessarily uniform. A noise-induced change of a transmitted symbol to a closely related, received symbol may produce far less distortion than a noise-induced change of a transmitted symbol to a very different, received symbol.

The DUDE models the non-uniform distortion effects of particular symbol transitions induced by noise with a matrix Λ. FIG. 6 displays one form of the symbol-transformation distortion matrix Λ. An element $d_{a_i \to a_j}$ of the matrix Λ provides the relative distortion incurred by substituting the symbol "$a_j$" in the noisy or recovered signal for the symbol "$a_i$" in the clean signal. An individual column j of the matrix Λ may be referred to as $\lambda_j$ or $\lambda_{a_j}$.

FIG. 7 illustrates computation of the relative distortion, with respect to the clean signal, expected from replacing a symbol "$a_a$" in a received, noisy signal by the symbol "$a_x$". As shown in FIG. 7, element-by-element multiplication of the elements of the column vectors $\lambda_{a_x}$ and $\pi_{a_a}$, an operation known as the Shur product of two vectors, and designated in the current discussion by the symbol □, produces the column vector $\lambda_{a_x} \square \pi_{a_a}$ in which the i-th element is the product of a distortion and probability, $d_{a_i \to a_x} P_{a_i \to a_a}$, reflective of the relative distortion expected in the recovered signal by replacing the symbol $a_a$ in the noisy symbol by the symbol "$a_x$" when the symbol in the originally transmitted, clean signal is "$a_i$."

FIG. 8 illustrates use of the column vector $\lambda_{a_x} \square \pi_{a_a}$ to compute a distortion expected for replacing "$a_a$" in the metasymbol $ba_ac$ in a noisy signal $s_{noisy}$ by the replacement symbol "$a_x$". In the following expression, and in subsequent expressions, the vectors $s_{noisy}$ and $s_{clean}$ denote noisy and clean signals, respectively. A different column vector q can be defined to represent the occurrence counts for all symbols in the clean signal that appear at locations in the clean signal that correspond to locations in the noisy signal around which a particular context [b, c] occurs. An element of the column vector q is defined as:

$$q(s_{noisy}, s_{clean}, b, c)[a_a] = |\{i : s_{clean}[i] = a_a, (s_{noisy}[i-k], s_{noisy}[i-k+1], \ldots, s_{noisy}[i-1]) = b, (s_{noisy}[i+1], s_{noisy}[i+2], \ldots, s_{noisy}[i+k]) = c\}|,$$

where $s_{clean}[i]$ and $s_{noisy}[i]$ denote the symbols at location i in the clean and noisy signals, respectively; and $a_a$ is a symbol in the alphabet A.

The column vector $q(s_{noisy}, s_{clean}, b, c)$ includes n elements with indices $a_a$ from "$a_1$" to "$a_n$," where n is the size of the symbol alphabet A. Note that the column vector $q(s_{noisy}, s_{clean}, b, c)$ is, in general, not obtainable, because the clean signal, upon which the definition depends, is unavailable. Multiplication of the transpose of the column vector $q(s_{noisy}, s_{clean}, b, c)$, $q^T(s_{noisy}, s_{clean}, b, c)$, by the column vector $\lambda_{a_x} \square \pi_{a_a}$ produces the sum of the expected distortions in the column vector times the occurrence counts in the row vector that together provide a total expected distortion for replacing "$a_a$" in the metasymbol $ba_ac$ in $s_{noisy}$ by "$a_x$". For example, the first term in the sum is produced by multiplication of the first elements in the row vector by the first element in the column vector, resulting in the first term in the sum being equal to $q^T(s_{noisy}, s_{clean}, b, c)[a_1](P_{a_1 \to a_a} d_{a_1 \to a_x})$ or, in other words, a contribution to the total distortion expected for replacing "$a_a$" by "$a_x$" in all occurrences of $ba_ac$ in $s_{noisy}$ when the corresponding symbol in $s_{clean}$ is $a_1$. The full sum gives the full expected distortion:

$$q^T(s_{noisy}, s_{clean}, b, c)[a_1](p_{a_1 \to a_a} d_{a_1 \to a_x}) +$$
$$q^T(s_{noisy}, s_{clean}, b, c)[a_2](p_{a_2 \to a_a} d_{a_2 \to a_x}) +$$
$$q^T(s_{noisy}, s_{clean}, b, c)[a_3](p_{a_3 \to a_a} d_{a_3 \to a_x}) +$$
$$\vdots$$
$$q^T(s_{noisy}, s_{clean}, b, c)[a_n](p_{a_n \to a_a} d_{a_n \to a_x})$$

As discussed above, DUDE does not have the advantage of knowing the particular clean signal, transmitted through the noise-introducing channel that produced the received noisy signal. Therefore, DUDE estimates the occurrence counts, $q^T(s_{noisy}, s_{clean}, b, c)$, of symbols in the originally transmitted, clean signal, by multiplying the row vector $m^T(s_{noisy}, b, c)$ by $\Pi^{-1}$ from the right. FIG. 9 shows estimation of the counts of the occurrences of symbols "$a_1$"-"$a_n$" for the clean signal.

The resulting expression $$m^T(s_{noisy},b,c)\Pi^{-1}(\lambda_{a_x}\square\pi_{a_a})$$

obtained by substituting $m^T(s_{noisy},b,c)\Pi^{-1}$ for $q^T(s_{noisy},s_{clean},b,c)$ represents DUDE's estimation of the distortion, with respect to the originally transmitted clean signal, produced by substituting "$a_x$" for the symbol "$a_a$" within the context [b, c] in the noisy signal $s_{noisy}$. DUDE denoises the noisy signal by replacing "$a_a$" in each occurrence of the metasymbol $ba_ac$ by that symbol "$a_x$" providing the least estimated distortion of the recovered signal with respect to the originally transmitted, clean signal, using the above expression. In other words, for each metasymbol $ba_ac$, DUDE employs the following transfer function to determine how to replace the central symbol $a_a$:

$$g_a^k(b, a_\alpha, c) = \frac{\arg\min}{a_x = a_1 \text{ to } a_n}\left[m^T(s_{noisy}, b, c)\prod\right]^{-1}(\lambda_{a_x} \square \pi_{a_\alpha})]$$

In some cases, the minimum distortion is produced by no substitution or, in other words, by the substitution $a_x$ equal to $a_a$.

Figure 10:
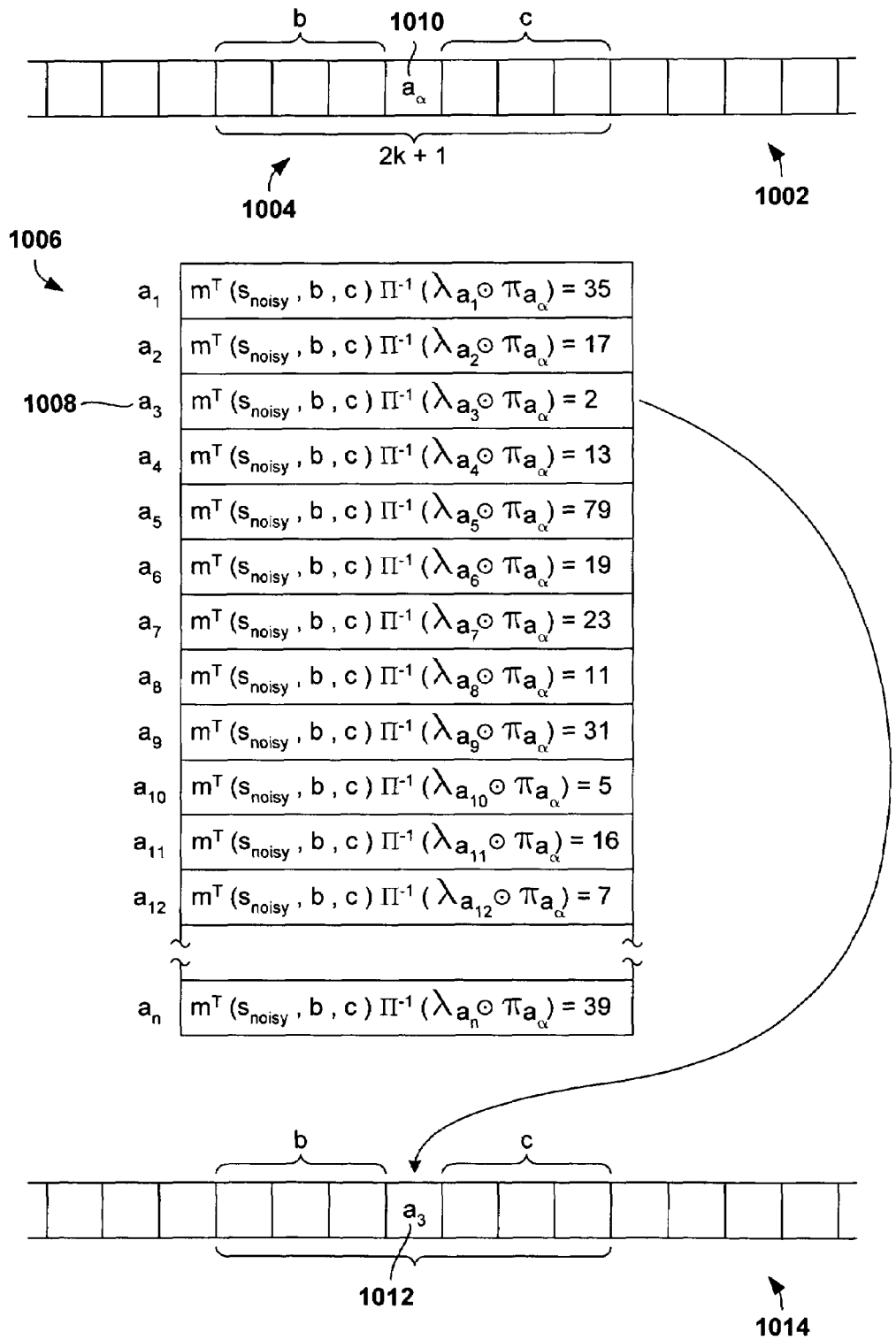
FIG. 10 illustrates the process by which a discrete denoiser denoises a noisy, received signal.

FIG. 10 illustrates the process by which DUDE denoises a noisy, received signal. First, as discussed above, DUDE compiles counts for all or a portion of the possible metasymbols comprising each possible symbol "$a_i$" within each possible context [b, c]. As discussed above, the counts are stored in column vectors $m(s_{noisy},b,c)$. In the next pass, DUDE again passes a sliding window over the noisy signal 1002. For each metasymbol, such as metasymbol 1004, DUDE determines the relative distortions of the recovered signal with respect to the clean signal that would be produced by substituting for the central character of the metasymbol "$a_a$" each possible replacement symbol "$a_i$" in the range i=1 to n. These relative distortions are shown in table 1006 in FIG. 10 for the metasymbol 104 detected in the noisy signal 1002. Examining the relative distortion table 1006, DUDE selects the replacement symbol with the lowest relative distortion, or, in the case that two or more symbols produce the same relative distortions, selects the first of the multiple replacement symbols with the lowest estimated distortion. In the example shown in FIG. 10, that symbol is "$a_3$" 1008. DUDE then replaces the central symbol "$a_a$" 1010 in the noisy signal with the selected replacement symbol "$a_3$" 1012 in the recovered signal 1014. Note that the recovered signal is generated from independent considerations of each type of metasymbol in the noisy signal, so that the replacement symbol selected in a previous step does not affect the choice for a replacement symbol in a next step for a different metasymbol. In other words, the replacement signal is generated in parallel, rather than substitution of symbols directly into the noisy signal. As with any general method, the above-described method by which DUDE denoises a noisy signal can be implemented using various data structures, indexing techniques, and algorithms to produce a denoising method that has both linear time and linear working-data-set complexities or, in other words, the time complexity is related to n, the length of the received, noisy signal, by multiplication by a constant, as is the working-data-set complexity.

The examples employed in the above discussion of DUDE are primarily 1-dimensional signals. However, as also discussed above, 2-dimensional and multi-dimensional signals may also be denoised by DUDE. In the 2-and-multi-dimensional cases, rather than considering symbols within a linear context, symbols may be considered within a contextual neighborhood. The pixels adjacent to a currently considered pixel in a 2-dimensional image may together comprise the contextual neighborhood for the currently considered symbol, or, equivalently, the values of a currently considered pixel and adjacent pixels may together comprise a 2-dimensional metasymbol. In a more general treatment, the expression $m^T(s_{noisy},b,c)\Pi^{-1}(\lambda_{a_x}\square\pi_{a_a})$ may be replaced by the more general expression:

$$m^T(s_{noisy},\eta)\Pi^{-1}(\lambda_{a_x}\square\pi_{a_a})$$

where $\eta$ denotes the values of a particular contextual neighborhood of symbols. The neighborhood may be arbitrarily defined according to various criteria, including proximity in time, proximity in display or representation, or according to any arbitrary, computable metric, and may have various different types of symmetry. For example, in the above-discussed 1-dimensional-signal examples, symmetric contexts comprising an equal number of symbols k preceding and following a currently considered symbol compose the neighborhood for the currently considered symbol, but, in other cases, a different number of preceding and following symbols may be used for the context, or symbols either only preceding or following a current considered symbol may be used.

Lossless and Lossy Compression

Figure 11A:
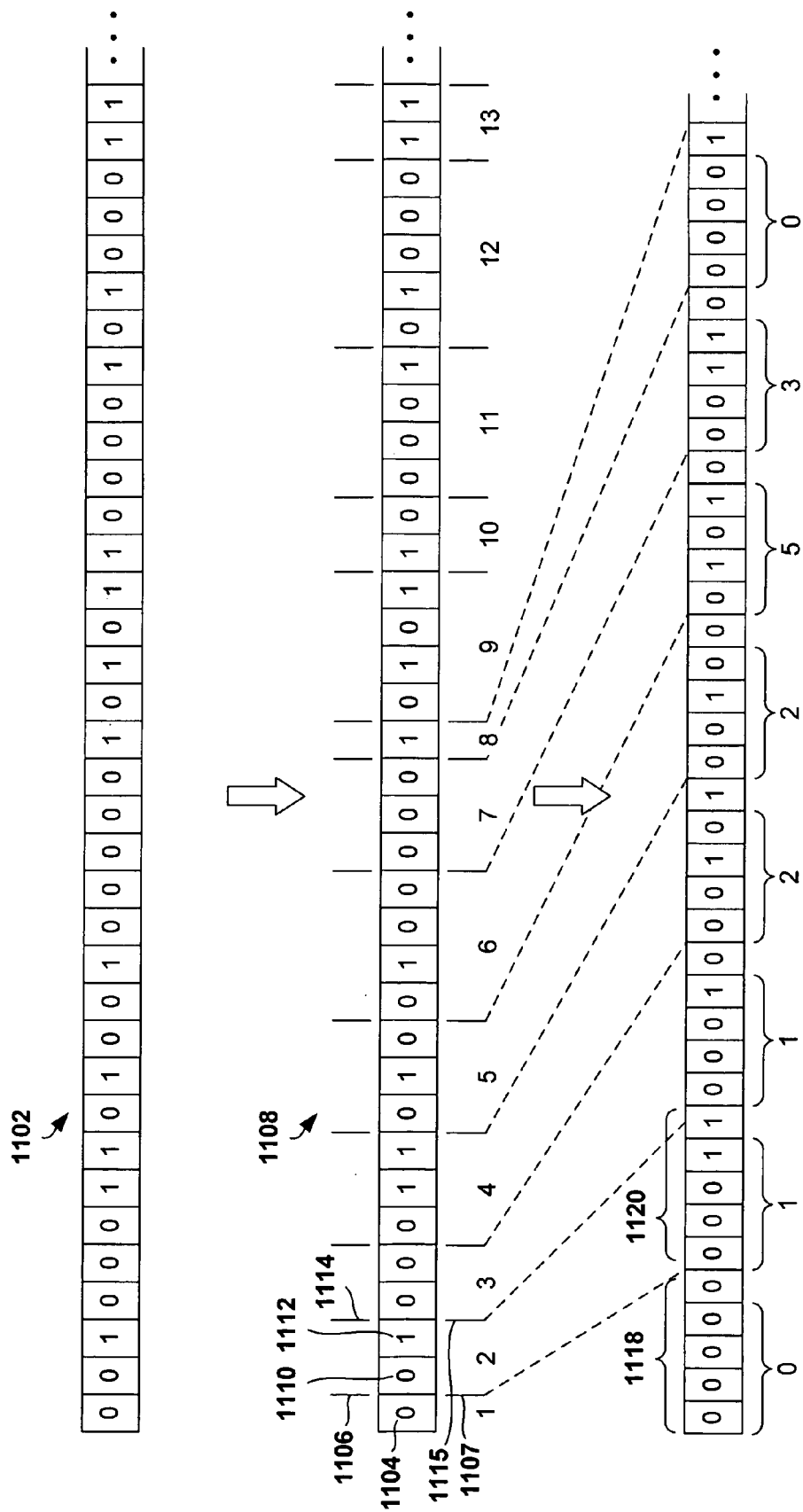
FIGS. 11A-B illustrate the Lempel-Ziv lossless data compression.
Figures 11B, 12:
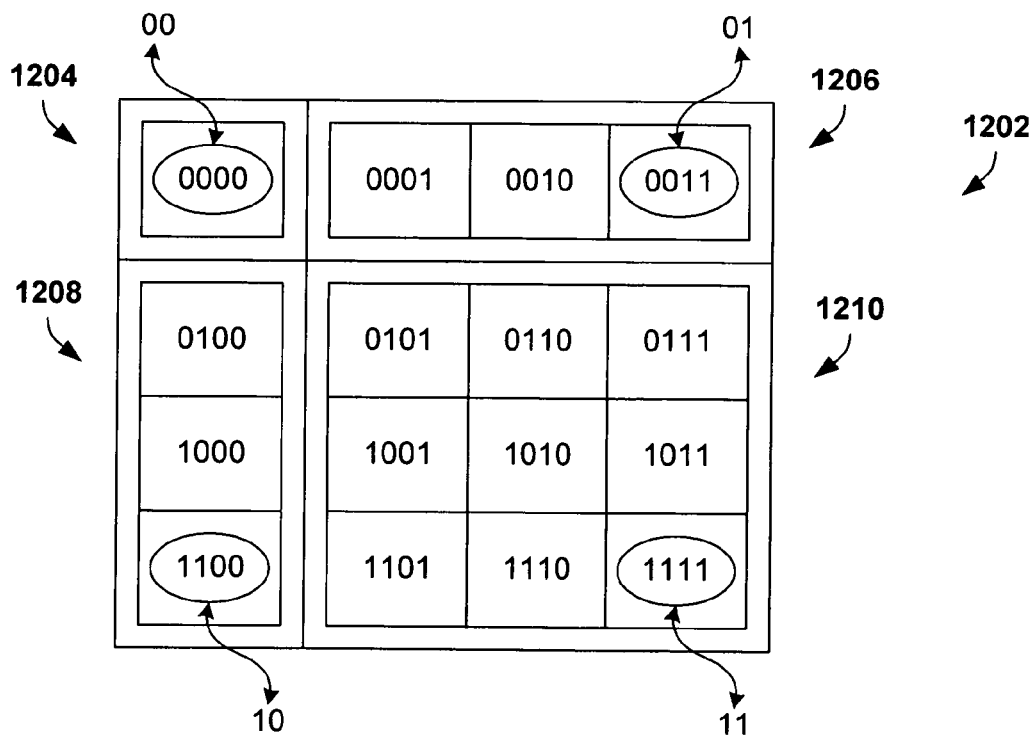
FIG. 12 illustrates an encoding scheme for the vector quantization lossy compression technique.

As mentioned above, lossless compression involves compressing data or a signal stream in a way that allows the original data or signal stream to be exactly restored, without distortion, upon decompression. One popular lossless data compression technique is known as the "Lempel-Ziv" compression technique. The Lempel-Ziv technique is most usually described using a simple example. FIGS. 11A-B illustrate Lempel-Ziv lossless data compression. In FIG. 11A, an initial, binary data signal 1102 is first shown. In a first step, the binary data signal is parsed, from left to right, to detect and tabulate each as-yet-not-tabulated substring. For example, the first "0" symbol 1104 constitutes, by itself, a first, as-yet-not-tabulated substring. Two vertical lines 1106-1107 are placed above and below, respectively, the parsed data signal 1108 to indicate the first tabulated substring boundary. Then, parsing of the next as-yet-not-encountered tabulated substring is undertaken. The first symbol, "0" 1110, comprises a substring of length 1, but this substring has already been recognized and tabulated. Therefore, parsing continues with the next symbol "1" 1112. The "0" 1110 and "1" 1112 together constitute an as-yet-not-tabulated substring "01," and so vertical lines 1114 and 1115 are placed above and below the parsed data signal 1108 to indicate the second tabulated substring boundary. The parsing continues in a left-to-right fashion, resulting in the 13 as-yet-not-tabulated substrings with corresponding substring indices 1-13. In a second step, an encoded data signal 1116 is created by replacing each parsed, tabulated substring in the parsed data signal 1108 with a substring-index/symbol pair. Each substring-index/symbol pair, in the example in FIG. 11A, includes 5 bits that include a first, 4-bit index and a second 1-bit symbol. Because each as-yet-not-tabulated substring comprises an already-tabulated-substring prefix and a single, final binary symbol that confers as-yet-not-tabulated status to the substring, each parsed substring can be represented as the index of the already-tabulated-substring prefix followed by the binary symbol that confers as-yet-not-tabulated status to the substring. For example, the first parsed substring "0" 1104 in the parsed data signal 1108 is represented by the substring-index/symbol pair including index 0

(0000 in binary notation) indicating no prefix, and the single binary symbol "0" 1118 in the encoded data signal 1116. Similarly, the next parsed substring comprising symbols "0" 1110 and "1" 1112 is represented by the substring-index/symbol pair 1120 including index 1 (0001 in binary notation) and the binary symbol "1." In this simple embodiment of the Lempel-Ziv method, the number of bits used to represent the index of the already-encountered-substring prefix is no smaller than the logarithm to the base 2 of the number of parsed substrings in the entire data sequence. This allows each parsed substring to have a unique index.

Implementations of the Lempel-Ziv technique normally construct a codebook, as shown in FIG. 11B, containing already-tabulated-substring/substring-index-symbol pair entries. In the example in FIGS. 11A-B, a fixed index length is employed, but in more sophisticated approaches, variable-length index fields within codewords are employed. Decoding of an encoded data string is carried out in reverse fashion, along with construction of the codebook. In the Example shown in FIG. 11A, the encoded data signal 1116 is initially longer than the original data signal 1102, but, as encoding progresses, longer and longer substrings are parsed and encoded, generally leading to compression ratios (ratio of compressed size to uncompressed size) less than one and on many types of data, such as English text, substantially less than one. As discussed above, lossy compression techniques result in loss of information or, in other words, decompressed data that is distorted with respect to the original compressed data. However, lossy compression techniques may produce dramatically better compression ratios than those produced by lossless compression techniques.

FIG. 12 illustrates the encoding scheme for the vector quantization lossy compression technique. The vector quantization technique involves breaking up a data stream for compression into a series of vectors of fixed length. For each vector, a shortened, encoded vector is substituted to produce the compressed version of the data. There is a many-to-one relationship between the vectors and encoded vectors. In decompression, the encoded vectors are expanded back into full-length vectors. However, because of the many-to-one relationship between vectors and encoded vectors, expansion of encoded vectors to full-length vectors results in a distorted, less than accurate decompressed data with respect to the original data.

FIG. 12 shows a vector-quantization encoding scheme for encoding vectors of length 4 by encoded vectors of length 2. In FIG. 12, all possible vectors of binary digits of length 4 are enumerated within the 16-entry table 1202. The possible vectors are partitioned into four subsets: (1) a first subset containing only the vector "0000" 1204; (2) a second partition 1206 containing the three vectors "0001," "0010," and "0011"; (3) a third partition 1208 containing the three vectors "0100," "1000," and "1100"; and (4) a large, fourth partition 1210 including all remaining binary vectors of length 4. The encoded vectors of length 2 corresponding to each of the four partitions are "00," "01," "10," and "11," respectively. The encoded vectors are simply the numbers 0, 1, 2, and 3 in base 2 notation. When encoded vectors are expanded, during decompression, the vectors of length 4 marked by ovals in each of the four partitions are chosen for the expansion. For example, the encoded vector "01" is expanded to the vector of length 4 "0011" wherever it occurs in the compressed data stream. Therefore, vectors "0001," "0010," and "0011" that occurred in the original data stream all occur as the vector "0011" in the decompressed data stream. Thus, compression and decompression result in loss of information.

Figure 13:
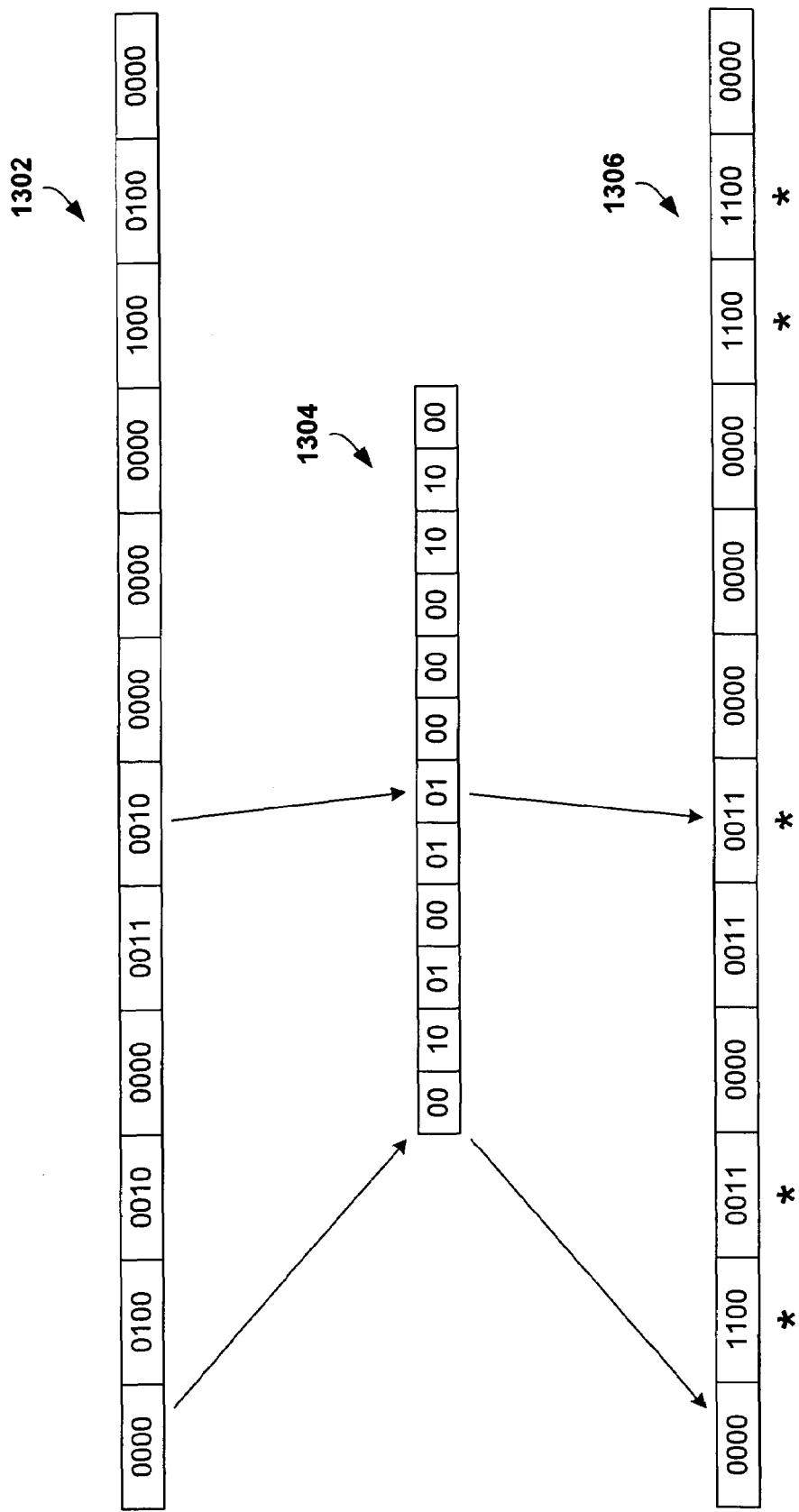
FIG. 13 illustrates lossy compression by the vector quantization technique described with reference to FIG. 12, using the encoding table illustrated in FIG. 12.

FIG. 13 illustrates lossy compression by the vector quantization technique described with reference to FIG. 12, using the encoding table illustrated in FIG. 12. The original data stream 1302 is broken up into vectors of length 4, and encoded as encoding vectors of length 2 to produce the compressed data stream 1304. Decompression of the compressed data stream results in the recovered data stream 1306. Those vectors of length 4 in the recovered data stream marked by asterisks in FIG. 13 have been altered by the compression/decompression operation. In vector quantization, the compression ratio is exactly determined by the respective length of the vectors and encoding vectors, but the potential distortion in the decompressed data stream is inversely related to the compression ratio. In other words, the greater the compression achieved, the greater potential distortion in the decompressed data stream. Arbitrary vector quantization encoding generally ignores the occurrence statistics for various symbols and metasymbols within the uncompressed data stream, potentially leading to significant distortion. In more elaborate vector quantization techniques, encoding vectors are carefully chosen to provide the greatest chance of reproducing the original data stream, based on the statistics of occurrences of the fixed length vectors in the original uncompressed data. However, even these more elaborate techniques produce significant distortion at sufficiently high degrees of compression.

Compression Methods Using a Denoiser

Embodiments of the present invention provide compression of data by applying a discrete denoiser, or other type of denoiser, to initially process the data, and then using either a lossless compression technique, such as the Lempel-Ziv technique, or a lossy compression technique to compress the output of the denoiser to produce the final compressed data. Decompression is carried out using the decompression technique corresponding to the compression technique to recover the output from the denoiser. The overall compression technique is generally lossy, since information is lost when the original data is processed by the denoiser, or denoised. In one embodiment, the combination of using the DUDE and the Lempel-Ziv technique represents the combination of two universally applicable techniques to carry out lossy compression, without the need for particular knowledge of the data to be compressed. As discussed above, effective lossy compression needs careful analysis of the data to be compressed in order to avoid introducing readily perceptible discontinuities and noise. The lossy compression techniques of the present invention, by contrast, can be carried out on a data signal without such analysis, because the DUDE tends generally to filter high-entropy noise. In alternative embodiments of the present invention, any of a number of different compression techniques may be employed in a second step of a general two-step process, in which the first step involved denoising. The compression method chosen for the second step depends on the nature of the data to be compressed, various computational and economic efficiencies related to the compression problem, and other considerations. For example, the JPEG-LS compression method is one of many compression techniques suited for compression of images.

Figure 14:
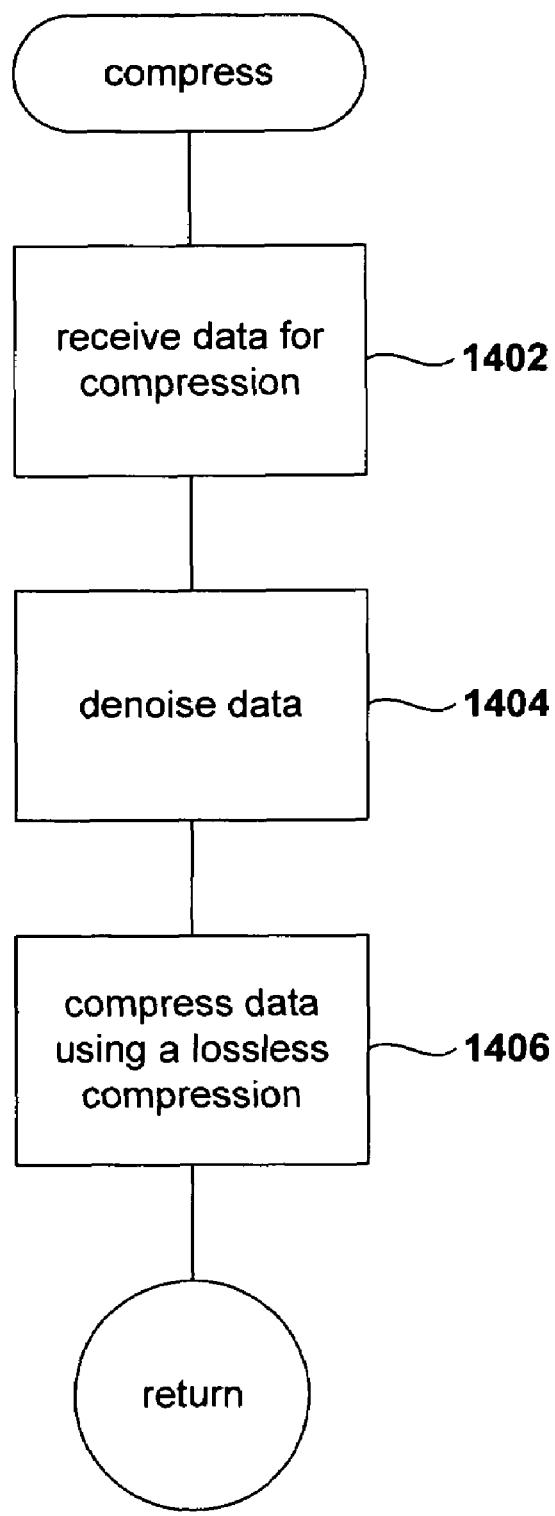
FIG. 14 is a control-flow diagram for one general embodiment of the present invention.

FIG. 14 is a control-flow diagram for a general embodiment of the present invention. In a first step 1402, the data to be compressed is received. In a next step 1404, the received data is denoised using a denoising method such as the discrete denoiser described in a previous subsection. The denoised data is then compressed, in a third step 1406, using a compression technique, such as the lossless Lempel-Ziv technique, to produce a final, compressed data. Denoising the original data filters the high entropy portions of the data, greatly facilitating lossless compressing and generally leading to better compression ratios.

Figure 15:
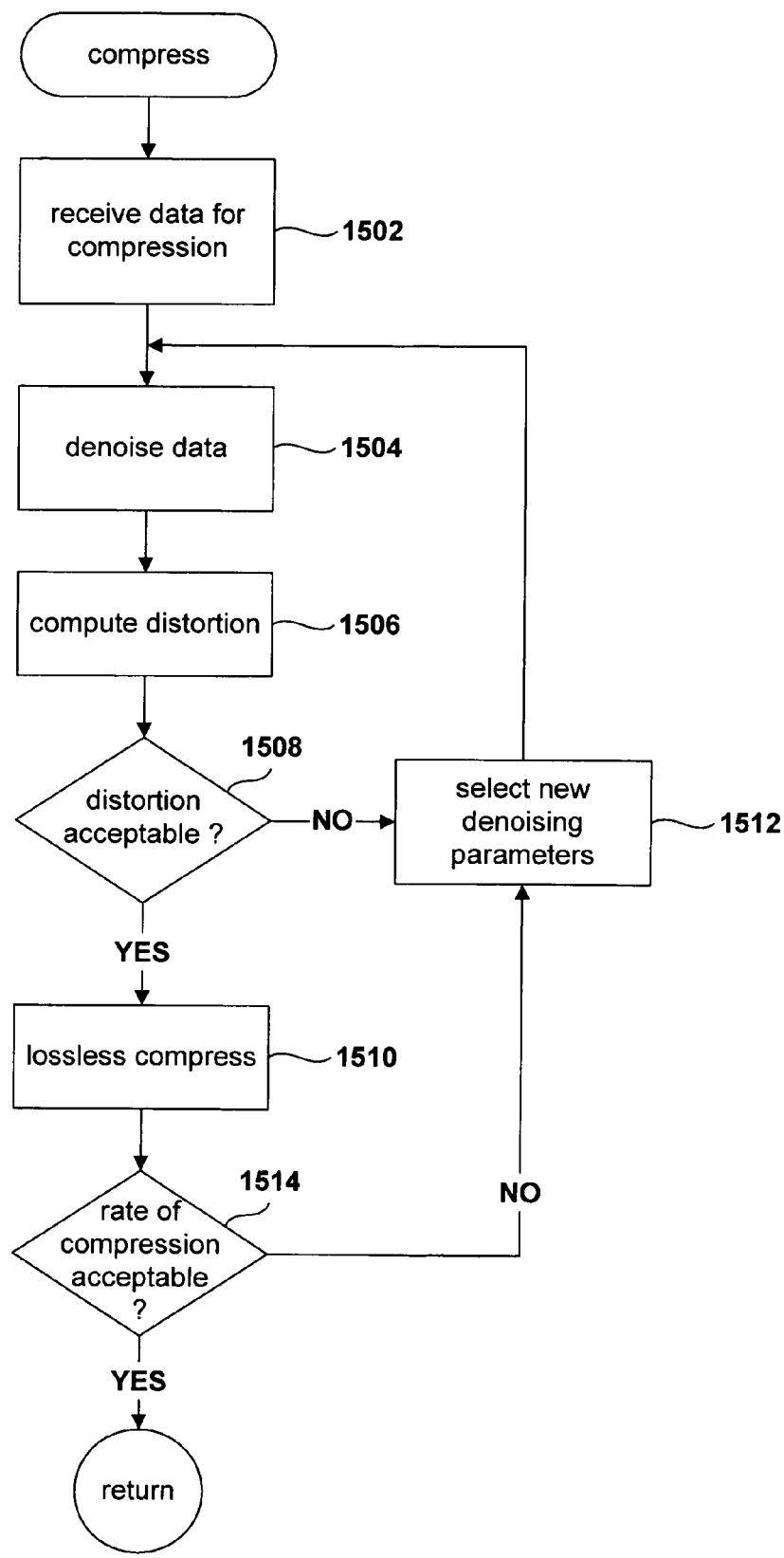
FIG. 15 illustrates a self-tuning implementation of the lossless compression method of various embodiments of the present invention.

In more elaborate embodiments, it may be desirable to tune the denoising step iteratively prior to the compression step, in order to produce the most desirable denoised data. FIG. 15 illustrates a self-tuning implementation of the compression method of various embodiments of the present invention. In step 1502, the data to be compressed is received. In step 1504, a denoising method is used to denoise the received data. In step 1506, a distortion metric is computed in order to ascertain the level of distortion introduced by the denoising step. If this level of distortion is acceptable, as determined in step 1508, then compression is undertaken in step 1510. Otherwise, new denoising parameters are selected, in step 1512, and control returns to step 1504 for a subsequent iteration of denoising. If the distortion level is acceptable, compression is carried out in step 1510. The resulting compression ratio, or compression rate, is determined in step 1514 by comparing the size of the compressed data to the size of the original data. If the compression rate is acceptable, then compression is complete. Otherwise, control flows back to step 1512, where new denoising parameters are selected in order to again denoise the input data in a way to provide a better compression ratio in the compression step 1510. Note that, in general, some limit on the number of iterations of denoising and compression may be set so that the overall compression technique is carried out within some maximum amount of time or following some maximum expenditure of computing resources.

The tuning of the denoising parameters, in step 1512, may be accomplished in many different ways. For example, tuning may be a purely automated process, a semi-automated process, or may be carried out manually, by a user who interacts with a user interface featuring knob-like interfaces that allow the user to adjust the denoising parameters. Any of the denoising parameters, including the contexts that are considered, the length of the contexts k, the channel transition matrix Π, and a distortion matrix Λ can be adjusted. In one method, the denoiser is tuned by modifying the channel transition matrix Π to find an optimal channel transition matrix Π that produces an optimized denoised signal leading to greatest compressibility and acceptable distortion. The optimization may be facilitated by heuristic approaches. One heuristic is to set the entries of each row i of Π, denoted $\pi_{i,1}, \ldots, \pi_{i,n}$ to be the probability distribution having the largest entropy subject to the constraint that $$\sum_j \pi_{i,j} \lambda_{i,j} < \Delta$$

where $\lambda_{i,j}$ are the entries of the ith row of the loss/distortion matrix Λ. A good initial value for Δ is the desired distortion level between the lossy representation and the original data. In this case, the above-described iterative approach may adjust Δ in order to converge on a desired ratio between compression efficiency and signal distortion.

Although the present invention has been described in terms of a particular embodiment, it is not intended that the invention be limited to this embodiment. Modifications within the spirit of the invention will be apparent to those skilled in the art. For example, although a discrete denoiser, such as the denoiser described in a previous subsection, is preferred, any of many different types of denoisers may be used in the lossy compression schemes that represent embodiments of the present invention. Similarly, many different compression techniques may be used to compress the denoised signal. As discussed above, any of an almost limitless number of methods for tuning the denoiser parameters may be used in internal feedback controls within the lossy compression technique in order to produce optimal compression levels for specified maximum levels of distortion. The lossy compression technique may be implemented as a software program, as a higher level script program that calls various existing denoiser and lossy compression modules, or may be even implemented in hardware or a combination of hardware and software within communications and data storage devices.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for compressing data comprising:
    receiving the data;
    repeatedly denoising the data using a denoiser to produce denoised data, each time selecting different denoising parameters wherein denoising parameters comprise
        symbol compositions of contexts within which symbols are evaluated by the denoiser;
        lengths of the contexts within which symbols are evaluated by the denoiser;
        values stored in a channel-transition matrix Π; and
        values stored in a distortion matrix Λ, until a distortion computed for the denoised data is lower than a threshold distortion; and
    compressing the denoised data to produce compressed data.

2. The method of claim 1 wherein denoising and compressing are repeated until compressed data with a size lower than a threshold size is produced.

3. The method of claim 1 wherein repeatedly denoising the data using a denoiser to produce denoised data, each time selecting different denoising parameters, until a distortion computed for the denoised data is lower than a threshold distortion is carried out by one of:
    an automated system;
    a semi-automated system that includes user interaction; and
    a manually controlled system in which a user interactively selects and adjusts denoising parameters.

4. The method of claim 1 wherein the denoiser is tuned by modifying the channel-transition matrix Π to find an optimal channel transition matrix Π that produces an optimized denoised signal leading to greatest compressibility and acceptable distortion.

5. The method of claim 4 further including:
setting entries of each row i of the channel-transition matrix Π, denoted $\pi_{i,1}, \ldots, \pi_{i,n}$ to be a probability distribution having a largest entropy subject to a constraint that $$\sum_j \pi_{i,j} \lambda_{i,j} < \Delta$$

where $\lambda_{i,j}$ are entries of the ith row of the distortion matrix Λ and Δ is a threshold distortion level.

6. The method of claim 5 wherein an initial value for Δ is selected as a desired distortion level between lossy representation of the data and the uncompressed data.

7. The method of claim 5 wherein Δ is iteratively adjusted as a denoising parameter in order to converge on a desired ratio between compression efficiency and signal distortion.

8. The method of claim 1 wherein compressing the data further includes compressing the data using one of:
a lossy decompression method; and
a lossless decompression method.

9. The method of claim 1 further including subsequently decompressing the compressed data by reversing the compression using one of:
a lossy decompression method; and
a lossless decompression method.

10. A computer readable storage medium containing executable instructions which, when executed in a processing system, causes the system to perform a method for compressing data comprising:
receiving the data;
repeatedly denoising the data using a denoiser to produce denoised data, each time selecting different denoising parameters wherein denoising parameters comprise
symbol compositions of contexts within which symbols are evaluated by the denoiser;
lengths of the contexts within which symbols are evaluated by the denoiser;
values stored in a channel-transition matrix Π; and
values stored in a distortion matrix Λ, until a distortion computed for the denoised data is lower than a threshold distortion; and
compressing the denoised data to produce compressed data.

11. The computer readable storage medium of claim 10 wherein denoising and compressing are repeated until compressed data with a size lower than a threshold size is produced.

12. The computer readable storage medium of claim 10 wherein repeatedly denoising the data using a denoiser to produce denoised data, each time selecting different denoising parameters, until a distortion computed for the denoised data is lower than a threshold distortion is carried out by one of:
an automated system;
a semi-automated system that includes user interaction; and
a manually controlled system in which a user interactively selects and adjusts denoising parameters.

13. The computer readable storage medium of claim 10 wherein the denoiser is tuned by modifying the channel-transition matrix Π to find an optimal channel transition matrix Π that produces an optimized denoised signal leading to greatest compressibility and acceptable distortion.

14. The computer readable storage medium of claim 13 wherein the method further includes:
setting entries of each row i of the channel-transition matrix Π, denoted $\pi_{i,1}, \ldots, \pi_{i,n}$ to be a probability distribution having a largest entropy subject to a constraint that $$\sum_j \pi_{i,j} \lambda_{i,j} < \Delta$$

where $\lambda_{i,j}$ are entries of the ith row of the distortion matrix Λ and Δ is a threshold distortion level.

15. The computer readable storage medium of claim 14 wherein an initial value for Δ is selected as a desired distortion level between lossy representation of the data and the uncompressed data.

16. The computer readable storage medium of claim 14 wherein Δ is iteratively adjusted as a denoising parameter in order to converge on a desired ratio between compression efficiency and signal distortion.

17. The computer readable storage medium of claim 10 wherein compressing the data further includes compressing the data using one of:
a lossy decompression method; and
a lossless decompression method.

18. The computer readable storage medium of claim 10 wherein the method further includes subsequently decompressing the compressed data by reversing the compression using one of:
a lossy decompression method; and
a lossless decompression method.

* * * * *

UNITED STATES PATENT AND TRADEMARK OFFICE
CERTIFICATE OF CORRECTION

PATENT NO.       : 7,474,793 B2
APPLICATION NO.  : 10/933789
DATED            : January 6, 2009
INVENTOR(S)      : Itschak Weissman et al.

It is certified that error appears in the above-identified patent and that said Letters Patent is hereby corrected as shown below:

In column 2, line 24, delete "$a_a$" and insert -- $a_\alpha$ --, therefor.

In column 2, line 26, delete " $\lambda_{a_x} \square \pi_{a_u}$ " and insert -- $\lambda_{a_x} \square \pi_{a_u}$ --, therefor.

In column 2, line 27, delete "$a_a$" and insert -- $a_\alpha$ --, therefor.

In column 2, line 28, delete "$ba_a c$" and insert -- $ba_\alpha c$ --, therefor.

In column 8, line 3, delete "$a_a$" and insert -- $a_\alpha$ --, therefor.

In column 8, line 5, delete " $\pi_{a_a}$ " and insert -- $\pi_{a_\alpha}$ --, therefor.

In column 8, line 8, delete " $\lambda_{a_x} \square \pi_{a_u}$ " and insert -- $\lambda_{a_x} \square \pi_{a_u}$ --, therefor.

In column 8, line 9, delete " $P_{a_i \rightarrow a_a}$ " and insert -- $P_{a_i \rightarrow a_\alpha}$ --, therefor.

In column 8, line 11, delete ""$a_a$"" and insert -- "$a_\alpha$" --, therefor.

In column 8, line 13, delete " $\lambda_{a_x} \square \pi_{a_u}$ " and insert -- $\lambda_{a_x} \square \pi_{a_u}$ --, therefor.

In column 8, line 14, delete "$a_a$" and insert -- $a_\alpha$ --, therefor.

In column 8, line 15, delete "$ba_a c$" and insert -- $ba_\alpha c$ --, therefor.

In column 8, line 25, delete "q($s_{noisy}$,$s_{clean}$,b,c) [$a_a$]=|{i:$s_{clean}$[i]= $a_a$,($s_{noisy}$[i-k]," and insert -- q($s_{noisy}$,$s_{clean}$,b,c) [$a_\alpha$]=|{i:$s_{clean}$[i]= $a_\alpha$,($s_{noisy}$[i-k], --, therefor.

In column 8, line 30, delete "$a_a$" and insert -- $a_\alpha$ --, therefor.

In column 8, line 33, delete "$a_a$" and insert -- $a_\alpha$ --, therefor.

UNITED STATES PATENT AND TRADEMARK OFFICE
CERTIFICATE OF CORRECTION

PATENT NO. : 7,474,793 B2
APPLICATION NO. : 10/933789
DATED : January 6, 2009
INVENTOR(S) : Itschak Weissman et al.

It is certified that error appears in the above-identified patent and that said Letters Patent is hereby corrected as shown below:

In column 8, line 38, delete " $\lambda_{a_1} \square \pi_{a_a}$ " and insert -- $\lambda_{a_x} \square \pi_{a_u}$ --, therefor.

In column 8, line 41, delete "$a_a$" and insert -- $a_\alpha$ --, therefor.

In column 8, line 42, delete "b$a_a$c" and insert -- b$a_\alpha$c --, therefor.

In column 8, line 46, delete " $(p_{a_1...a_a} d_{a_1...a_x})$ " and insert -- $(p_{a_1 \to a_\alpha} d_{a_1 \to a_x})$ --, therefor.

In column 8, line 47, delete "$a_a$" and insert -- $a_\alpha$ --, therefor.

In column 8, line 48, delete "b$a_a$c" and insert -- b$a_\alpha$c --, therefor.

In column 9, line 5, delete " $\lambda_{a_1} \square \pi_{a_a}$ " and insert -- $\lambda_{a_x} \square \pi_{a_u}$ --, therefor.

In column 9, line 10, delete "$a_a$" and insert -- $a_\alpha$ --, therefor.

In column 9, line 12, delete "$a_a$" and insert -- $a_\alpha$ --, therefor.

In column 9, line 12, delete "b$a_a$c" and insert -- b$a_\alpha$c --, therefor.

In column 9, line 16, delete "b$a_a$c," and insert -- b$a_\alpha$c, --, therefor.

In column 9, line 18, delete "$a_a$" and insert -- $a_\alpha$ --, therefor.

In column 9, line 27, delete "$a_a$" and insert -- $a_\alpha$ --, therefor.

In column 9, line 38, delete "$a_a$" and insert -- $a_\alpha$ --, therefor.

In column 9, line 48, delete "$a_a$" and insert -- $a_\alpha$ --, therefor.

UNITED STATES PATENT AND TRADEMARK OFFICE
CERTIFICATE OF CORRECTION

PATENT NO. : 7,474,793 B2
APPLICATION NO. : 10/933789
DATED : January 6, 2009
INVENTOR(S) : Itschak Weissman et al.

It is certified that error appears in the above-identified patent and that said Letters Patent is hereby corrected as shown below:

In column 10, line 10, delete " $(\lambda_{a_x} \Box \pi_{a_x})$ " and insert -- $(\lambda_{a_x} \Box \pi_{a_x})$ --, therefor.

In column 10, line 13, delete " $(\lambda_{a_x} \Box \pi_{a_x})$ " and insert -- $(\lambda_{a_x} \Box \pi_{a_x})$ --, therefor.

In column 15, line 39, in Claim 10, delete "arc" and insert -- are --, therefor.

Signed and Sealed this

Third Day of November, 2009

David J. Kappos
*Director of the United States Patent and Trademark Office*